United States Patent [19]

Arakawa et al.

[11] Patent Number: 5,774,235
[45] Date of Patent: Jun. 30, 1998

[54] IMAGE PROCESSING APPARATUS

[75] Inventors: Naoto Arakawa; Masanori Sakai, both of Yokohama; Toshihiro Kadowaki; Takayuki Komine, both of Kawasaki; Tetsuya Ohnishi, Yokohama, all of Japan

[73] Assignee: Canon Kabushiki Kaisha, Tokyo, Japan

[21] Appl. No.: 266,321

[22] Filed: Jun. 27, 1994

Related U.S. Application Data

[63] Continuation of Ser. No. 821,303, Jan. 13, 1992, abandoned, which is a continuation of Ser. No. 437,828, Nov. 17, 1989, abandoned.

[30] Foreign Application Priority Data

Nov. 18, 1988 [JP] Japan .................................. 63-291562

[51] Int. Cl.⁶ .............................. H04N 1/40; H04N 1/387
[52] U.S. Cl. ......................... 358/453; 358/451; 358/448
[58] Field of Search ..................................... 358/400, 401, 358/404, 500, 442, 443, 444, 448, 450, 451, 452, 453

[56] References Cited

U.S. PATENT DOCUMENTS

| | | | |
|---|---|---|---|
| 4,286,291 | 8/1981 | Taylor et al. ............................ | 358/138 |
| 4,538,183 | 8/1985 | Kanno et al. ........................... | 358/452 |
| 4,591,904 | 5/1986 | Urabe et al. .............................. | 358/25 |
| 4,873,570 | 10/1989 | Suzuki et al. ............................. | 358/80 |
| 4,918,542 | 4/1990 | Nagashima et al. ..................... | 358/451 |
| 4,942,462 | 7/1990 | Shiota ........................................ | 358/78 |
| 4,951,132 | 8/1990 | Nakade et al. ............................ | 358/80 |
| 4,992,864 | 2/1991 | Akiyama .................................... | 358/80 |
| 5,050,003 | 9/1991 | Horii et al. ............................. | 358/342 |
| 5,218,673 | 6/1993 | Fujiwara .................................. | 396/164 |

FOREIGN PATENT DOCUMENTS

| | | | |
|---|---|---|---|
| 291000 | 11/1988 | European Pat. Off. ....... | H04N 1/387 |
| 60-81676 | 5/1985 | Japan .............................. | G06F 15/40 |
| 60-81677 | 5/1985 | Japan .............................. | G06F 15/40 |
| 662686 | 10/1987 | Switzerland ................... | H04N 1/387 |
| 2174568 | 11/1986 | United Kingdom ........... | H04N 1/387 |
| 2194117 | 2/1988 | United Kingdom ........... | H04N 1/387 |

*Primary Examiner*—Thomas D. Lee
*Assistant Examiner*—Jerome Grant, II
*Attorney, Agent, or Firm*—Fitzpatrick, Cella, Harper & Scinto

[57] ABSTRACT

An image forming system for receiving image data from a memory and for forming images onto an image forming medium includes a reducing circuit for reducing stored image data in the memory, and an operation unit for displaying a plurality of images onto a display screen by the reducing circuit and for selecting a plurality of arbitrary images from the plurality of images displayed. A printer forms images of the image data selected by the operation unit and designates in the memory desired positions of the image forming medium.

49 Claims, 29 Drawing Sheets

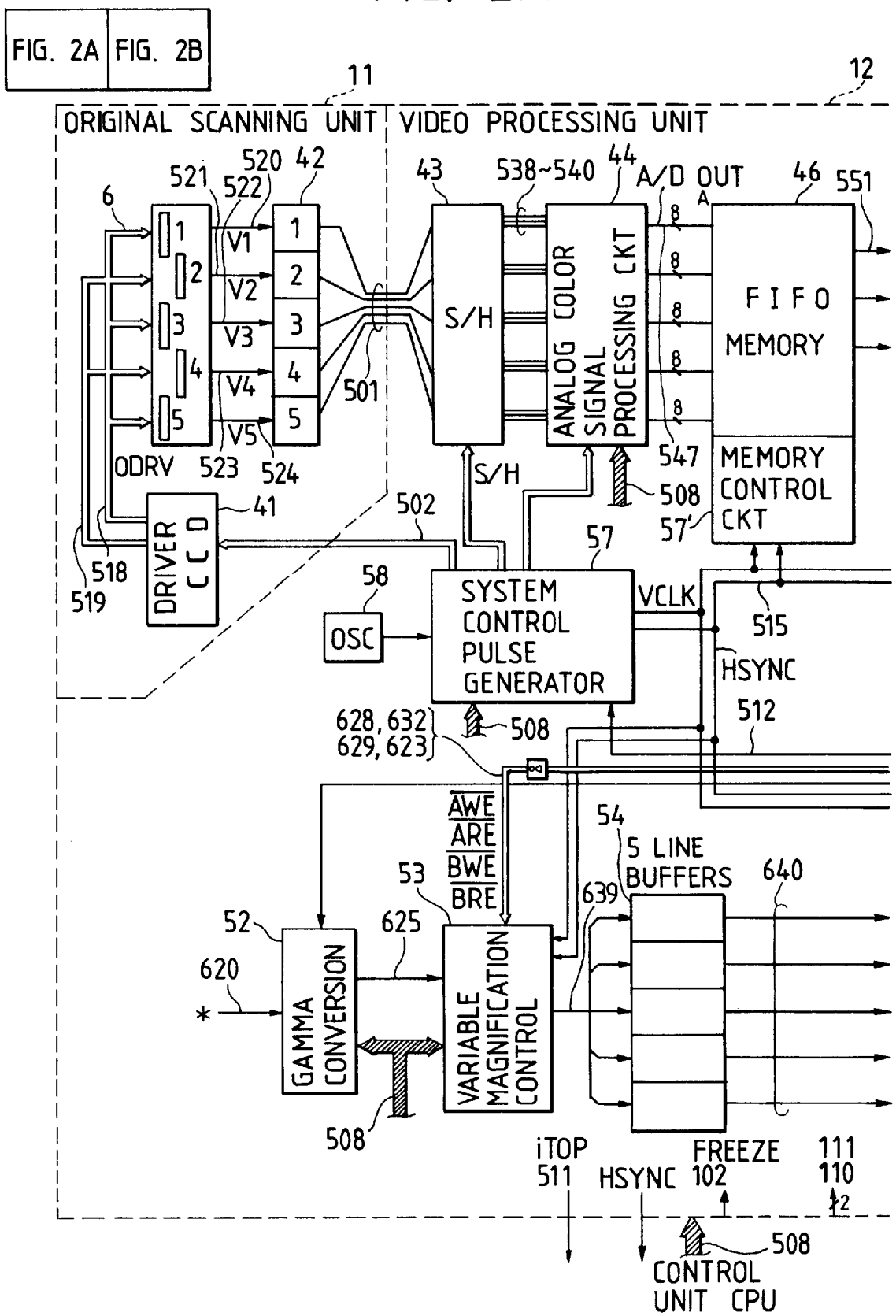

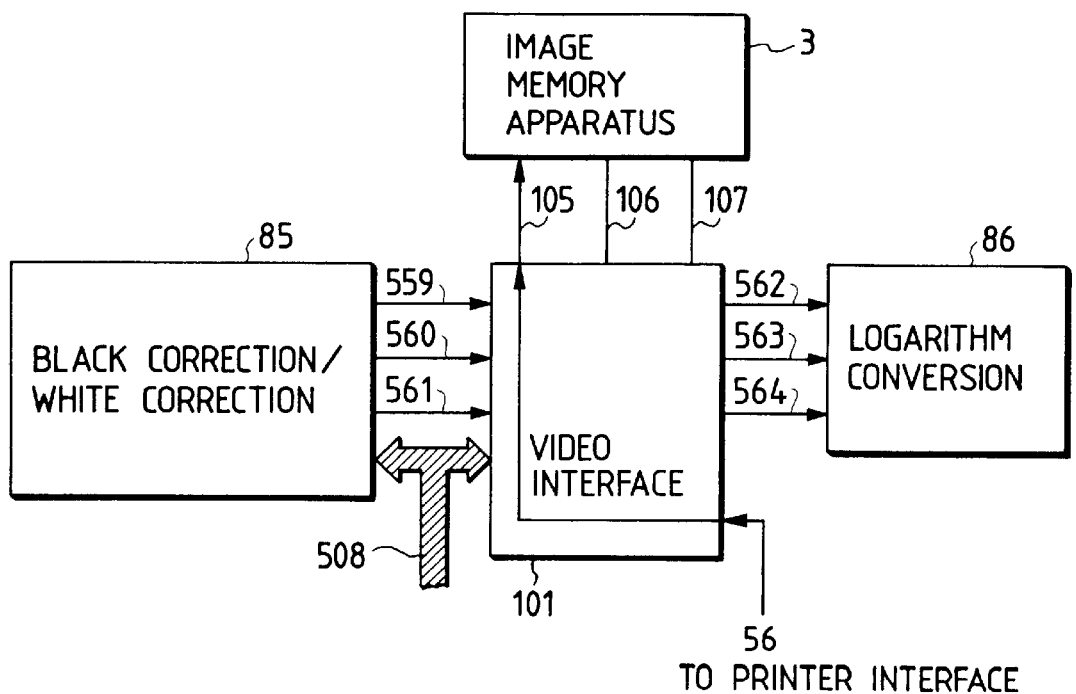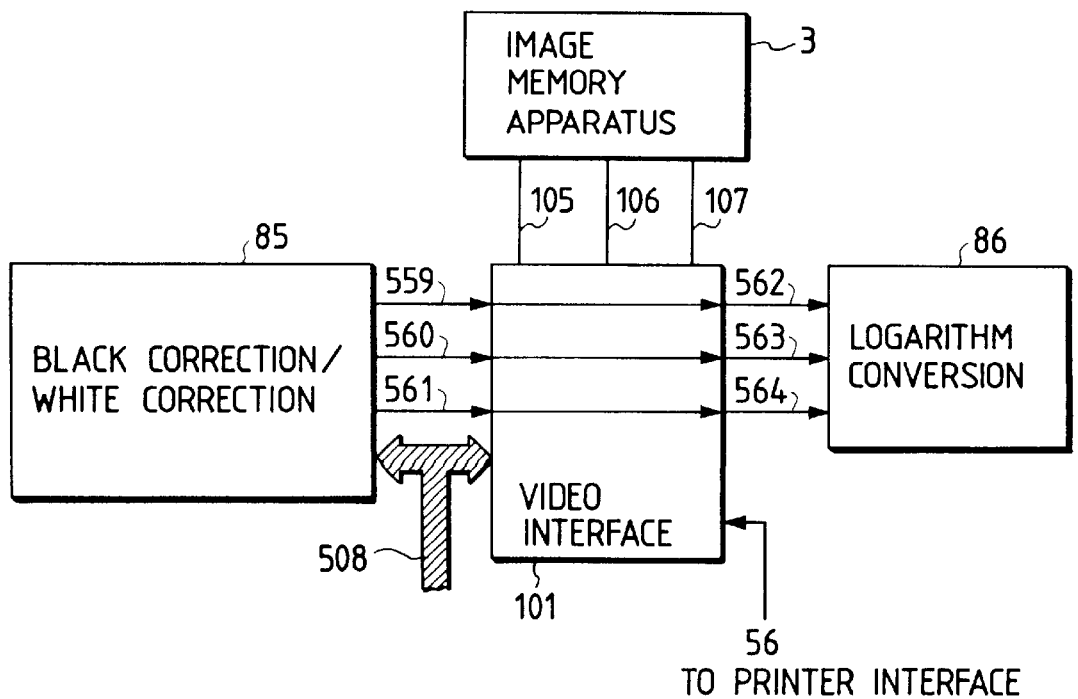

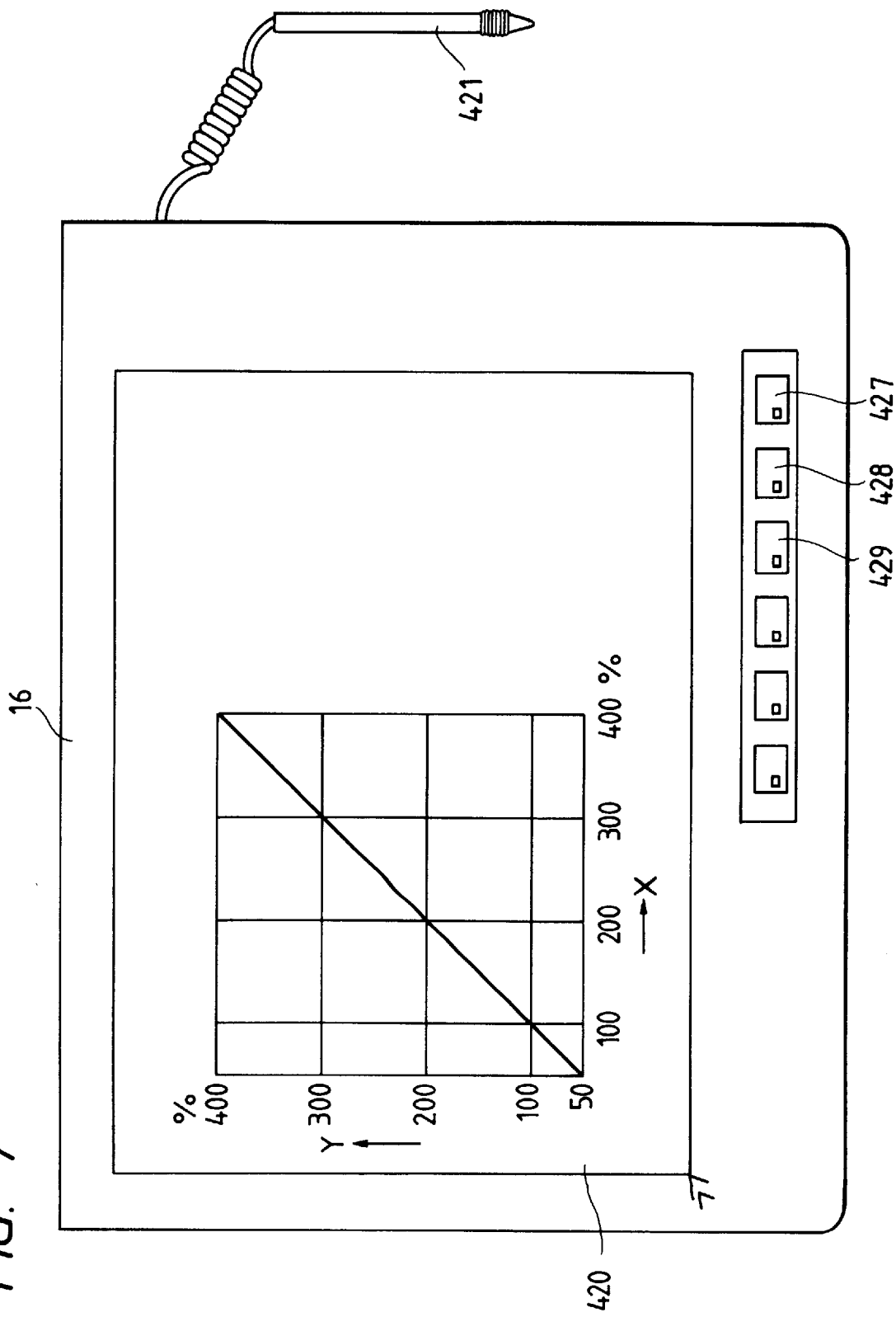

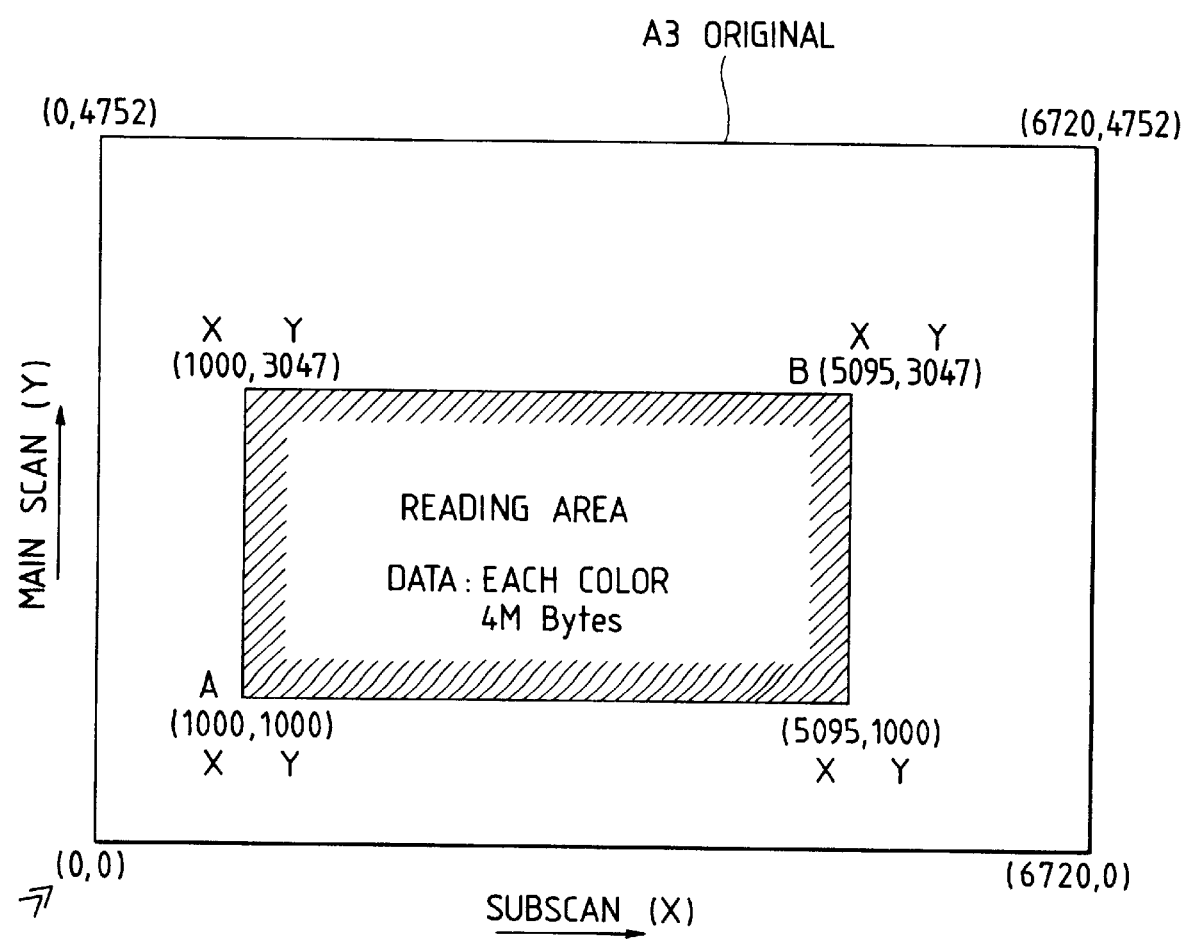

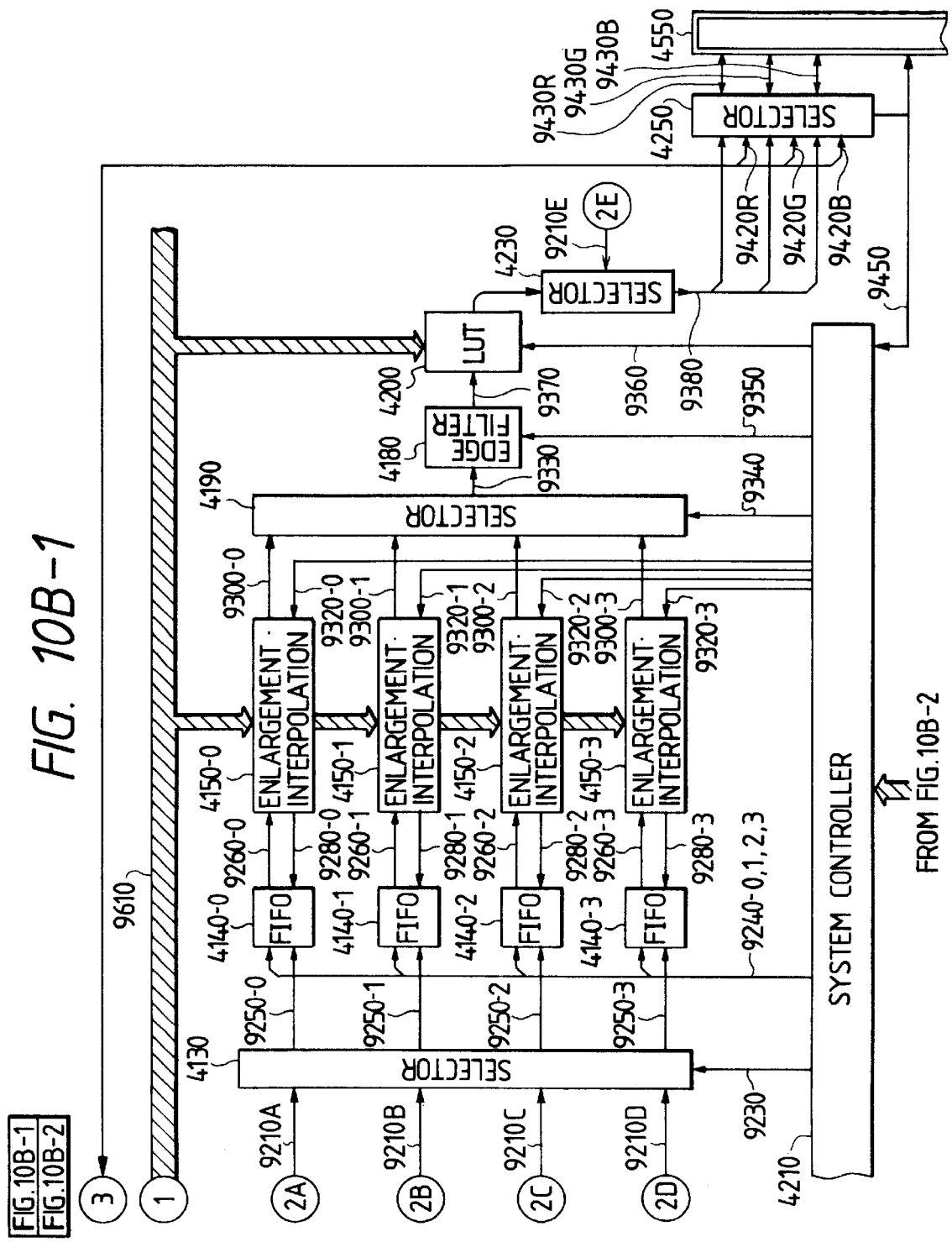

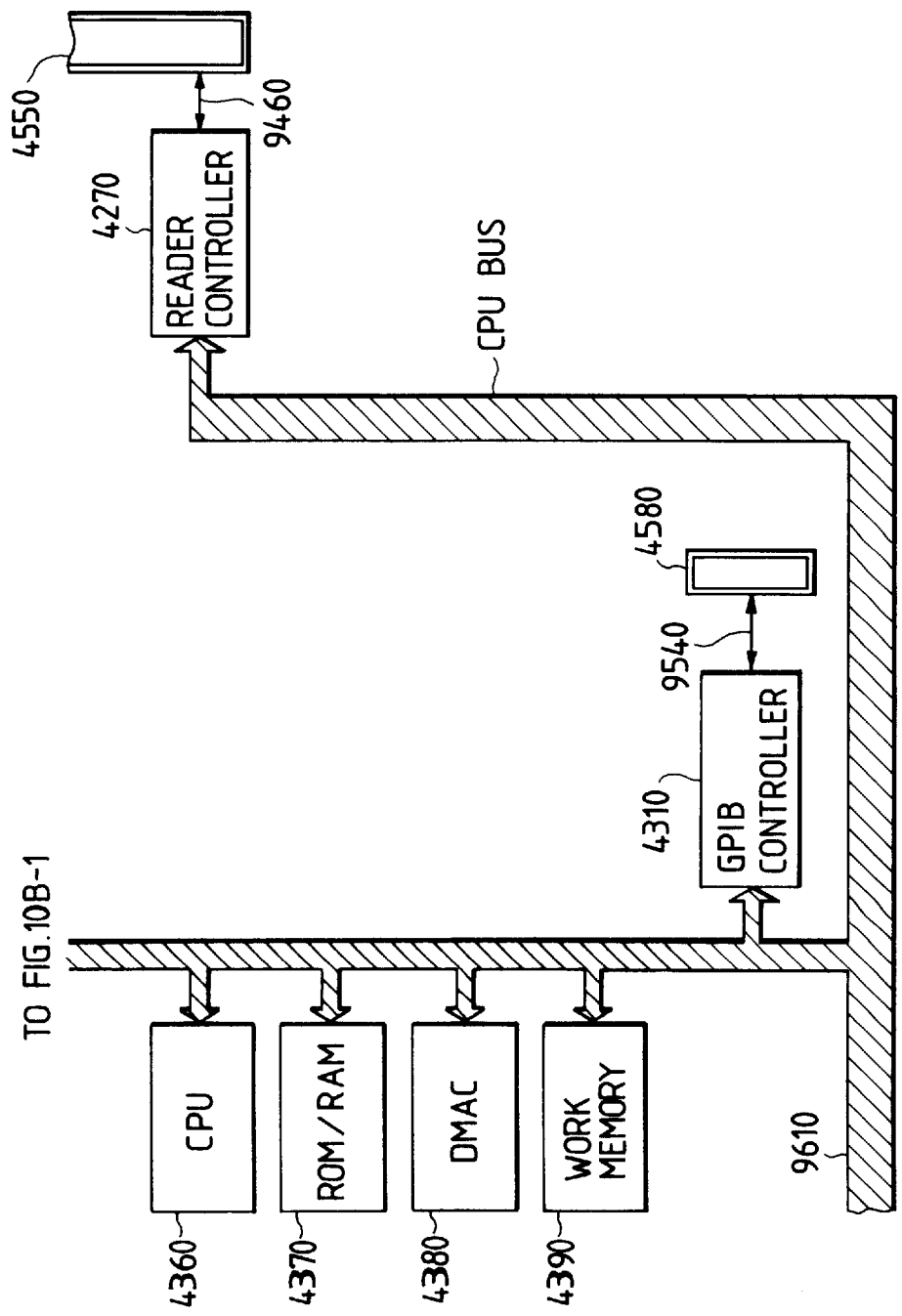

FIG. 16

| | MEMORY(R)<br>4060R | MEMORY(G)<br>4060G | MEMORY(B)<br>4060B |
|---|---|---|---|
| 2M | IMAGE 15 | IMAGE 15 | IMAGE 15 |
| 1.875M | IMAGE 14 | IMAGE 14 | IMAGE 14 |
| 1.75M | IMAGE 13 | IMAGE 13 | IMAGE 13 |
| 1.625M | IMAGE 12 | IMAGE 12 | IMAGE 12 |
| 1.5M | IMAGE 11 | IMAGE 11 | IMAGE 11 |
| 1.375M | IMAGE 10 | IMAGE 10 | IMAGE 10 |
| 1.25M | IMAGE 9 | IMAGE 9 | IMAGE 9 |
| 1.125M | IMAGE 8 | IMAGE 8 | IMAGE 8 |
| 1M | IMAGE 7 | IMAGE 7 | IMAGE 7 |
| 0.875M | IMAGE 6 | IMAGE 6 | IMAGE 6 |
| 0.75M | IMAGE 5 | IMAGE 5 | IMAGE 5 |
| 0.625M | IMAGE 4 | IMAGE 4 | IMAGE 4 |
| 0.5M | IMAGE 3 | IMAGE 3 | IMAGE 3 |
| 0.375M | IMAGE 2 | IMAGE 2 | IMAGE 2 |
| 0.25M | IMAGE 1 | IMAGE 1 | IMAGE 1 |
| 0.125M | IMAGE 0 | IMAGE 0 | IMAGE 0 |
| 0 | | | |

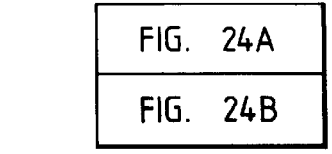
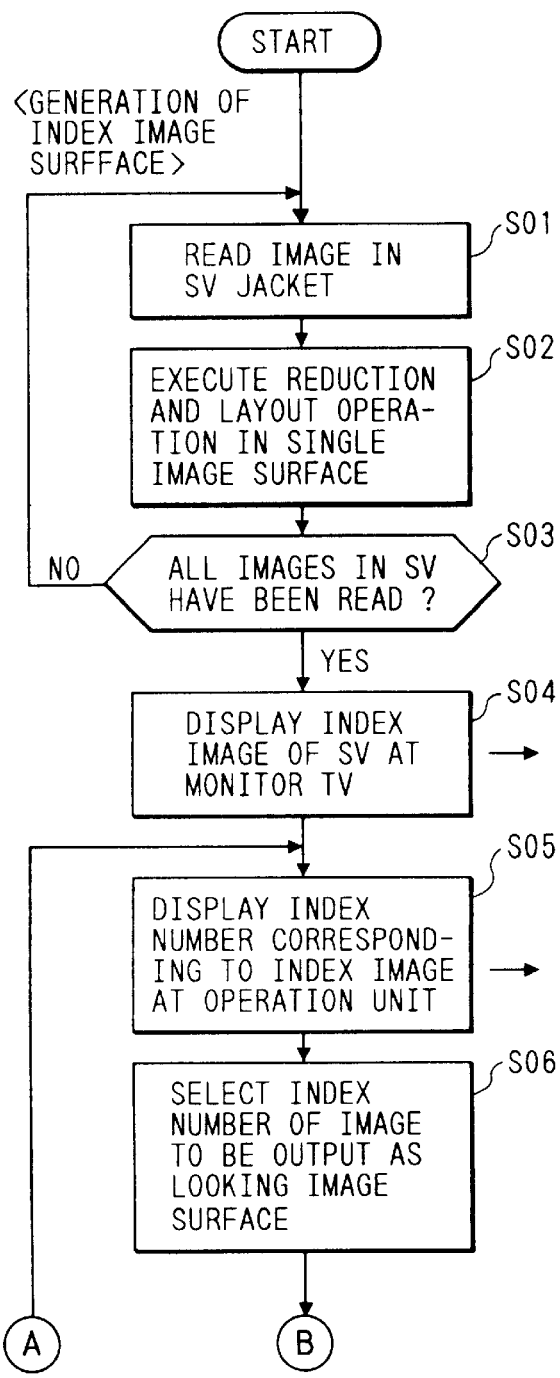
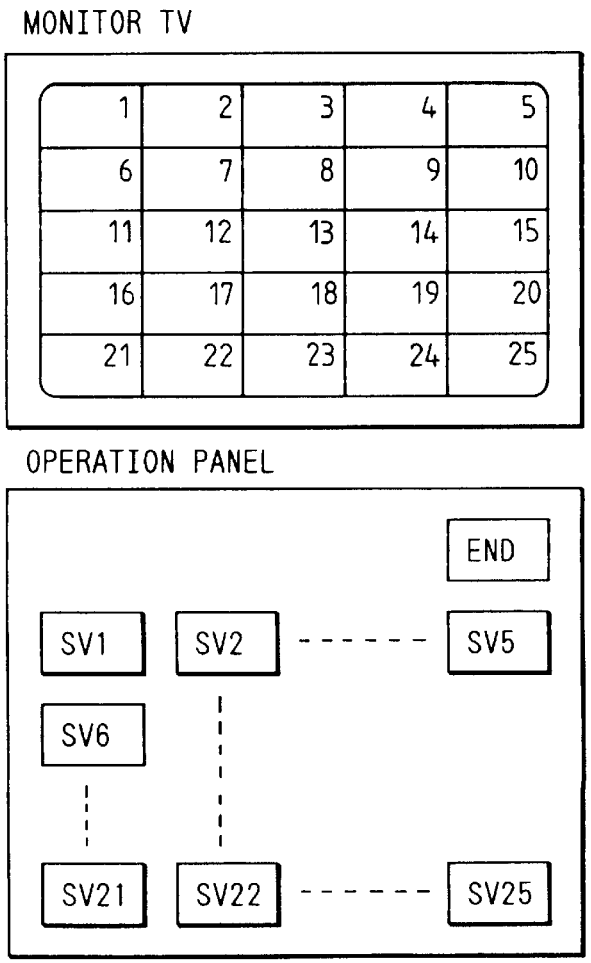

IMAGE PROCESSING APPARATUS

This application is a continuation of application Ser. No. 07/821,303 filed Jan. 13, 1992, now abandoned, which was a continuation of application Ser. No. 07/437,828 filed Nov. 17, 1989, now abandoned.

BACKGROUND OF THE INVENTION

1. Field of the Invention

The present invention relates to an image processing system and, more particularly, to a processing system for regenerating image data from a medium in which the image data has been stored and forming an image.

2. Related Background Art

Recently, a digital television, a video printer, and the like have been proposed as apparatuses in which input color information is once stored into memory means such as a semiconductor memory or the like and, thereafter, the stored image data is read out and an image is formed, and the image is displayed, printed, or the like.

However, in those apparatuses, a video signal for television is merely output, and a size of image source of the video signal and the size and output position of the image source of the video signal to an output medium for outputting are also unconditionally determined. One of the input image data is merely displayed and output or is printed as a hard copy at a predetermined size and at a predetermined position and its function is limited.

In recent years, the signal which is displayed or output to an image processing apparatus such as a television receiver or the like is not limited to the video signals of those apparatuses but an image from an SV ("still video") record regenerating apparatus or the like or from a personal computer, a work station, a color scanner, or the like also needs to be output to the image processing apparatus.

However, the image stored in the SV record regenerating apparatus, a computer, or the like comprises a plurality of image data. There is a drawback such that it is impossible to easily select desired one of those plurality of image data and to layout and output the selected image data to an arbitrary or fixed position on an output paper.

SUMMARY OF THE INVENTION

It is an object of the present invention to provide an image processing system which can easily select desired image data from a plurality of image data stored and can, further, form an image at an arbitrary position in consideration of the above problems.

In addition to the above object, it is another object of the invention to provide an image processing system which can form an image of a high quality.

Still another object of the invention is to provide an image processing system which is suitable to select and regenerate a color image.

To accomplish the above objects, according to an embodiment of the invention, there is provided an image forming apparatus for receiving image data from a memory apparatus to store image data and forming an image onto an image forming medium, wherein the apparatus comprises: means for reducing the image data stored in the image memory apparatus; means which can display a plurality of images onto a display image surface by the reducing means and can select a plurality of arbitrary images from the plurality of images displayed; and image forming means for forming images of the image data which were selected by the selecting means and designated in the image memory apparatus to desired positions on the image forming medium.

The above and other objects and features of the present invention will become apparent from the following detailed description and the appended claims with reference to the accompanying drawings.

BRIEF DESCRIPTION OF THE DRAWINGS

FIGS. 3 to 6 are diagrams schematically showing examples of the switching control of a video interface unit of the color reader 1 of the embodiment;

FIG. 7 is an external view of a digitizer of the embodiment;

FIG. 8 is a diagram for explaining address data indicated by the digitizer of the embodiment;

FIG. 16 is an arrangement diagram of image data in image memories of the image memory apparatus of the embodiment;

DETAILED DESCRIPTION OF THE PREFERRED EMBODIMENTS

An embodiment of the present invention will be described in detail hereinbelow with reference to the drawings.

[Embodiment 1]

Figure 1:
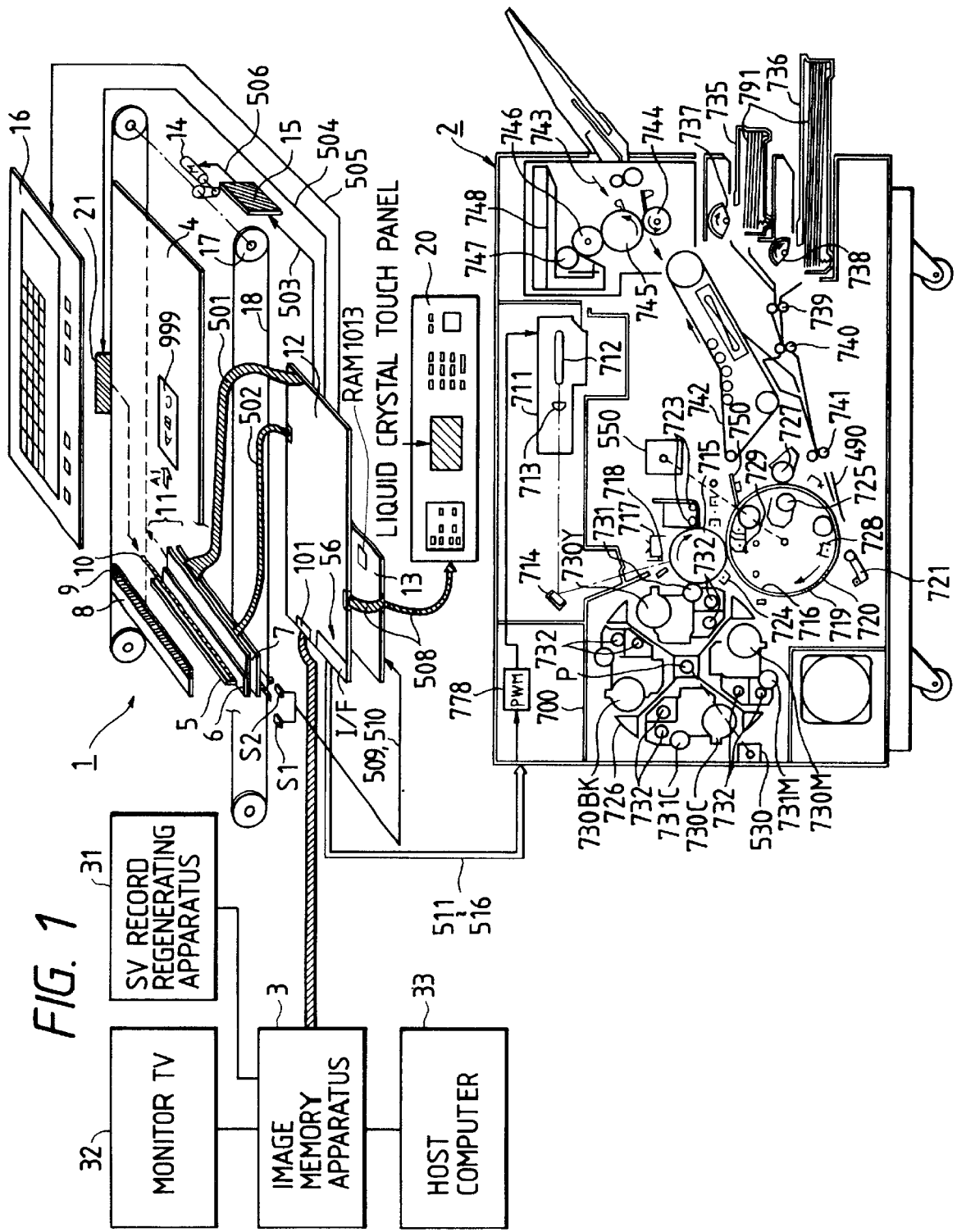
FIG. 1 is a system constructional diagram of an embodiment according to the present invention.
Figure 2B:
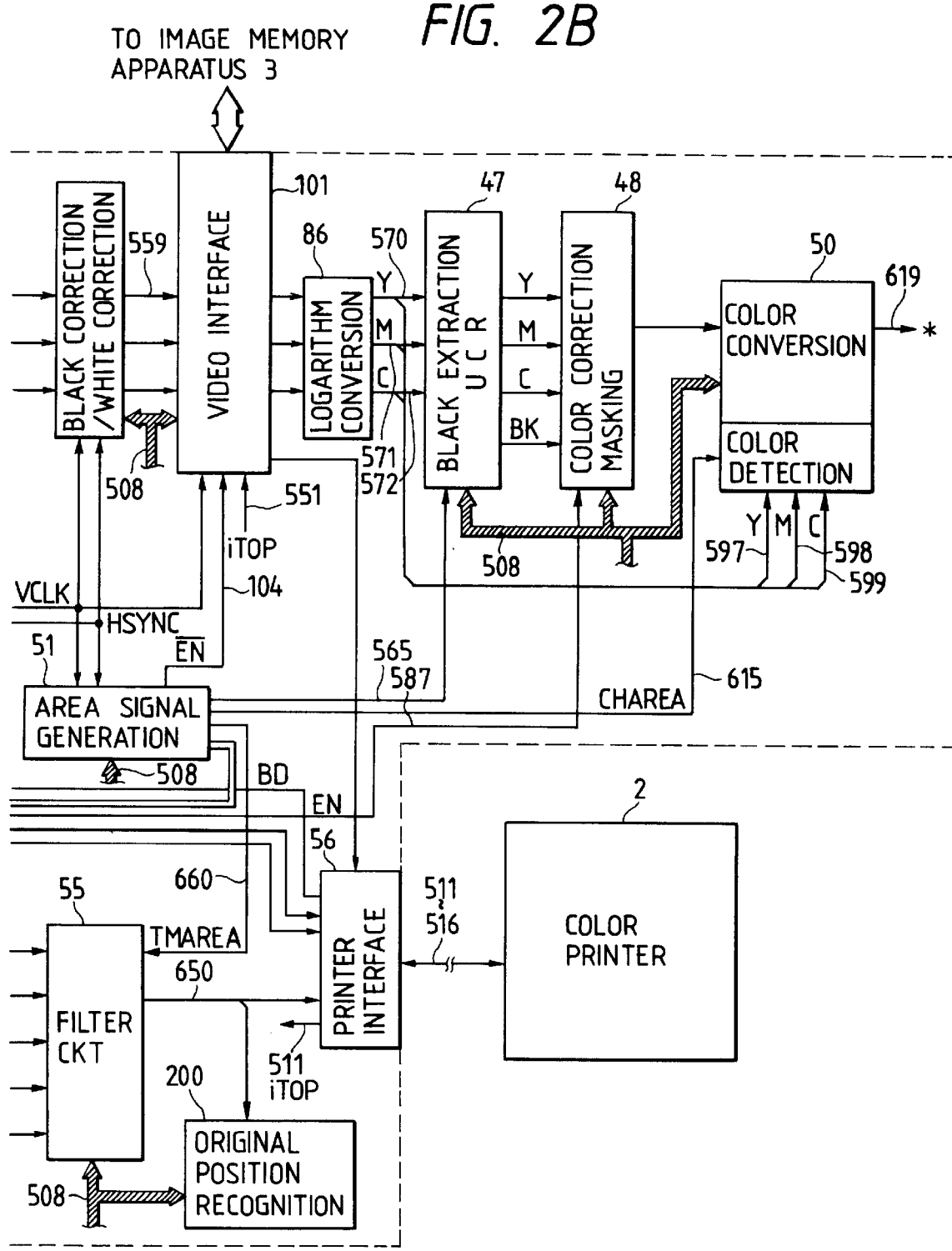
FIG. 2, comprised of FIGS. 2A and 2B, is a detailed block diagram of a color reader 1 of the embodiment.

FIG. 1 is a system constructional diagram showing an example of a schematic internal construction of a color image forming system of an embodiment according to the invention. As shown in FIG. 1, the system of the embodiment comprises: a digital color image reading apparatus (hereinafter, referred to as a "color reader") 1 to read a digital color image which is arranged in the upper portion of the system; and a digital color image printing apparatus (hereinafter, referred to as a "color printer") 2 to print and output a digital color image, an image memory apparatus 3, an SV record regenerating apparatus 31, a monitor television 32, and a host computer 33 which are arranged in the lower portion of the system.

The color reader 1 of the embodiment comprises color separating means, which will be explained herein-later, and a photoelectric converting device which is constructed by a CCD or the like. The color reader 1 reads color image data of a read original every color and converts into electric digital image signals.

On the other hand, the color printer 2 is a laser beam color printer of the electrophotographic type in which color images are limited every color in accordance with the digital image signal to be output and are copy transferred onto a recording paper a plurality of times in a digital dot form and recorded.

The image memory apparatus 3 is an apparatus in which a read digital image from the color reader 1 is stored or an analog video signal from the SV record regenerating apparatus 31 is digitized and converted into a digital image and, thereafter, the digital image is stored.

The SV record regenerating apparatus 31 is an apparatus in which images are photographed by an SV camera and the image data recorded in a SV floppy is regenerated and output as an analog video signal. On the other hand, the SV record regenerating apparatus 31 can receive an analog video signal and can also record into an SV floppy in addition to the above functions.

The monitor television 32 displays images stored in the image memory apparatus 3 and also displays the content of the analog video signal output from the SV record regenerating apparatus 31.

The host computer 33 has functions to transmit the image data to the image memory apparatus 3 and to receive the image data from the color reader 1 or the SV record regenerating apparatus which has been stored in the image memory apparatus 3. The host computer 33 also controls the color reader 1 and color printer 2 and the like.

Each of the above sections will now be described in detail hereinbelow.

<Description of the color reader 1>

A construction of the color reader 1 will be first described.

In the color reader 1 in FIG. 1, reference numeral 999 denotes an original; 4 indicates a platen glass onto which an original is put; and 5 represents a rod array lens for converging a reflected light image from the original which was exposed and scanned by a halogen exposure lamp 10 and for inputting the image into an equal size type full color sensor 6. The rod array lens 5, the full color sensor 6, a sensor output signal amplifying circuit 7, and the halogen exposure lamp 10 integrally construct an original scanning unit 11. The scanning unit 11 exposes and scans the original 999 in the direction indicated by an arrow ($A_1$). The image data of the original 999 to be read is sequentially read every line by exposing and scanning the original scanning unit 11. The read color separation image signal is amplified to a predetermined voltage by the sensor output signal amplifying circuit 7. Thereafter, it is input to a video processing unit via a signal line 501 and processed. The signal line 501 is constructed as a coaxial cable to guarantee the signal transmission with a high fidelity. Reference numeral 502 denotes a signal line to supply drive pulses of the equal size type full color sensor 6. All of the necessary drive pulses are produced in a video processing unit 12. Reference numerals 8 and 9 denote a white plate and a black plate to correct the white and black levels of the image signal. Signal levels of predetermined concentrations can be obtained by irradiating the white plate 8 and the black plate 9 by the halogen exposure lamp 10, respectively, and are used to correct the white and black levels of the video signal.

Reference numeral 13 denotes a control unit to control the whole color reader 1 of the embodiment having a microcomputer. The control unit 13 executes the display on an operation panel 20, the control of key inputs, the control of the video processing unit 12, and the like through a bus 508. In addition, the control unit 13 detects the position of the original scanning unit 11 through signal lines 509 and 510 on the basis of detection signals by position sensors $S_1$ and $S_2$.

Further, the control unit 13 executes all of the controls in the color reader 1. That is, the control unit 13 controls a stepping motor drive circuit 15 to pulse drive a stepping motor 14 to move the scanning unit 11 through a signal line 503. The control unit 13 controls the on/off operations and a light amount of the halogen exposure lamp 10 by an exposure lamp driver 21 through a signal line 504. The control unit 13 controls a digitizer 16, internal keys, the display section, and the like through a signal line 505.

The color image signal which was read by the exposure scanning unit 11 upon exposing and scanning of the original is input to the video processing unit 12 through the sensor output signal amplifying circuit 7 and the signal line 501.

The original scanning unit 11 and video processing unit 12 will now be described in detail with reference to FIG. 2.

The color image signal input to the video processing unit 12 is separated into three color signals of G (green), B (blue), and R (red) by a sample and hold circuit S/H 43. The separated color image signals are analog processed by an analog color signal processing circuit 44 and, thereafter, they are A/D converted into the digital color image signals.

Figure 10A:
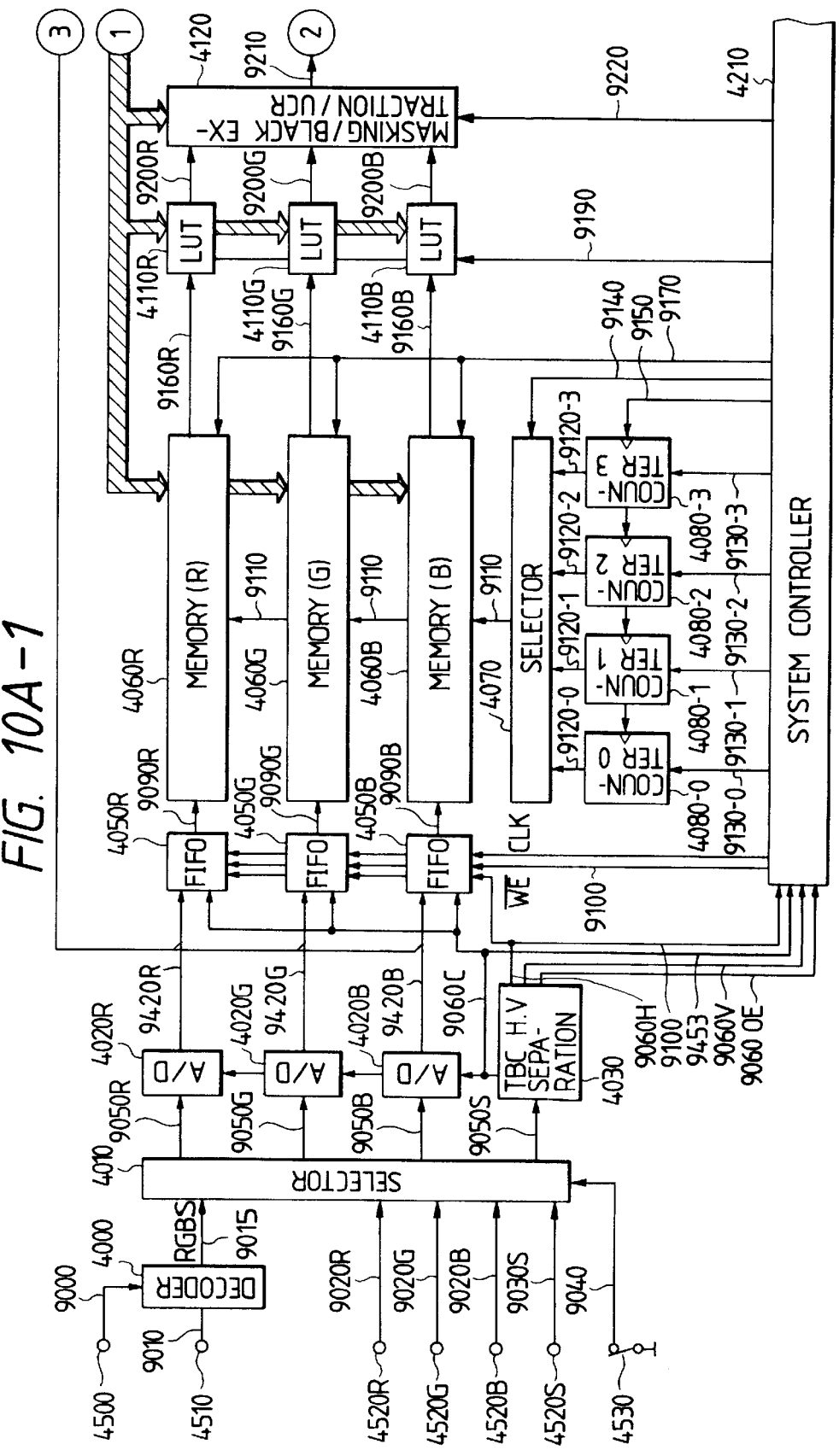
FIG. 10A comprised of FIGS. 10A1 and 10A2 and FIG. 10B comprised of FIGS. 10B1 and 10B2 are detailed block diagrams of the image memory apparatus of the embodiment.
Figures 2, 10A:
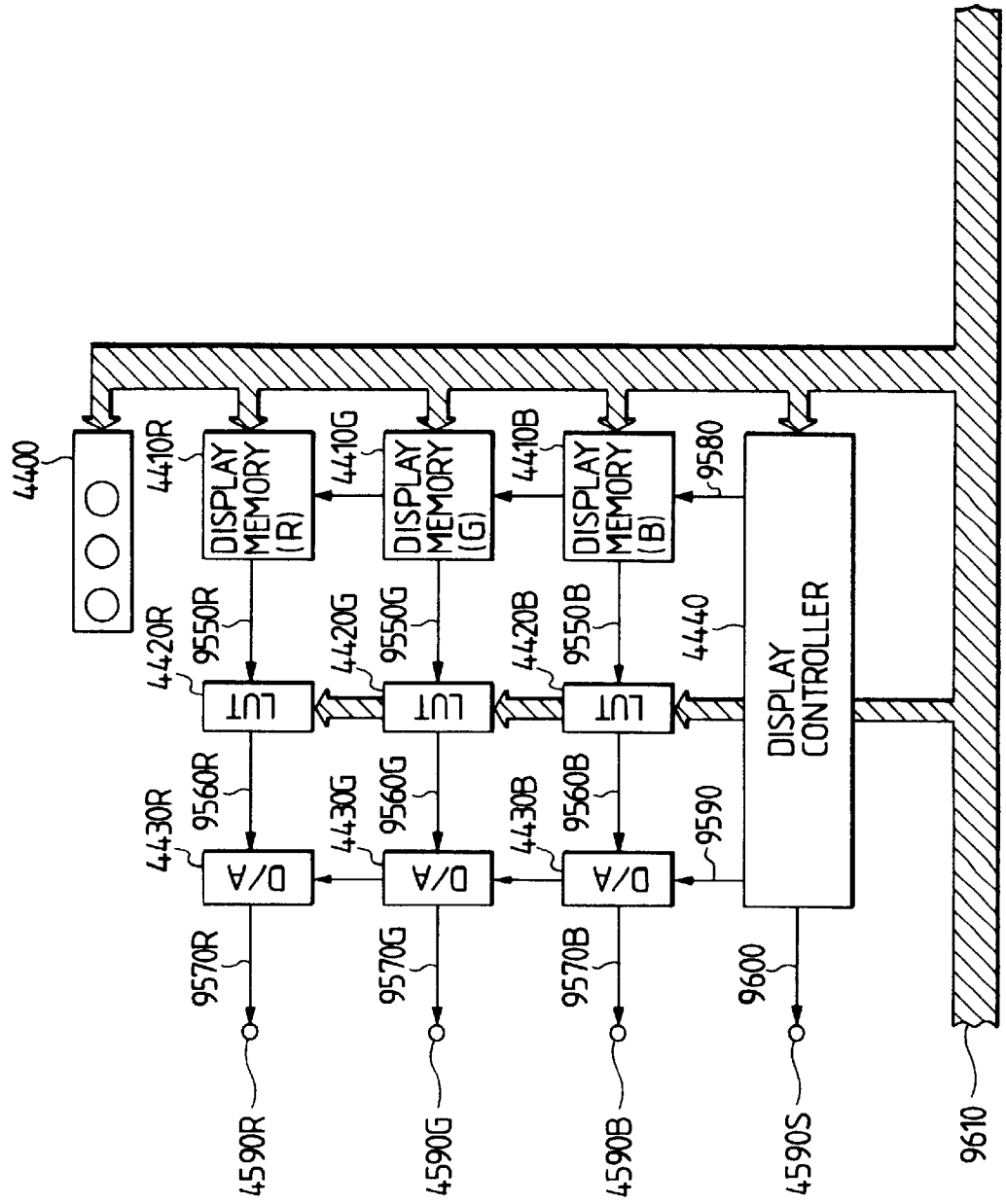

In the embodiment, the color reading sensor 6 in the original scanning unit 11 is constructed in a zigzag shape which is divided into five areas as also shown in FIG. 2. Deviations of the reading positions among the channels 2 and 4 which have previously been scanned and the remaining channels 1, 3, and 5 are corrected by using the color reading sensor 6 and an FIFO memory 46. The signals after the positional deviations were corrected which are output from the FIFO memory 46 are input to a black correction/white correction circuit 85. A variation in the dark state of the sensor 6, a variation in light amount of the lamp 10, a variation in sensitivity of the sensor, and the like are corrected by using the signals corresponding to the reflected lights from the white plate 8 and black plate 9 mentioned above.

The color image data which is proportional to the input light amount of the color sensor 6 is input to a video interface 101 and connected to the image memory apparatus 3.

The video interface 101 has the following four functions as shown in FIGS. 3 to 6: that is, (1) the function to output a signal 559 from the black correction/white correction circuit 85 to the image memory apparatus 3 (FIG. 3), (2) the function to input the image data from the image memory apparatus 3 to a logarithm conversion circuit 86 (FIG. 4), (3) the function to output the image data from a printer interface 56 to the image memory apparatus 3 (FIG. 5), and (4) the function to transmit the signal 559 from the black correction/white correction circuit 85 to the logarithm conversion circuit 86 (FIG. 6).

The above four functions are switched as shown in FIGS. 3 to 6 by the CPU control line 508.

<Description of the image memory apparatus 3>

The reading (fetching) control in the color reader 1 and the storage control of the read image data into the image memory apparatus 3 in the embodiment will now be described.

The reading operation by the color reader 1 is executed by a digitizer, which will be explained hereinafter. FIG. 7 shows an external view of the digitizer 16.

In FIG. 7, reference numeral 427 denotes an entry key to transfer the image data from the color reader 1 to the image memory apparatus 3. A coordinate detecting plate 420 is used to set an arbitrary area on the reading original or to set a reading magnification or the like. A point pen 421 is used to designate the coordinates of the pen.

To transfer the image data of an arbitrary area on the original to the image memory apparatus 3, the entry key 427 in FIG. 7 is depressed and, thereafter, a reading position is indicated by the point pen 421.

The image data of the reading area is sent to the video processing unit 12 through the communication line 505 in FIG. 1. The video processing unit 12 transmits the input image signal from the video interface 101 to the image memory apparatus 3 by the CPU control line 508.

After the entry key 427 in FIG. 7 was depressed, if a reading position is not indicated by the point pen 421, the color reader 1 detects a size of original 999 by the prescan and transmits the size data as image reading area information to the image memory apparatus 3 through the video interface 101.

A process to transmit the information of the indicated area of the original 999 to the image memory apparatus 3 will now be described.

FIG. 8 shows an example of addresses of the information (points A and B) of the area indicated by the point pen 421 of the digitizer 16.

Figure 9:
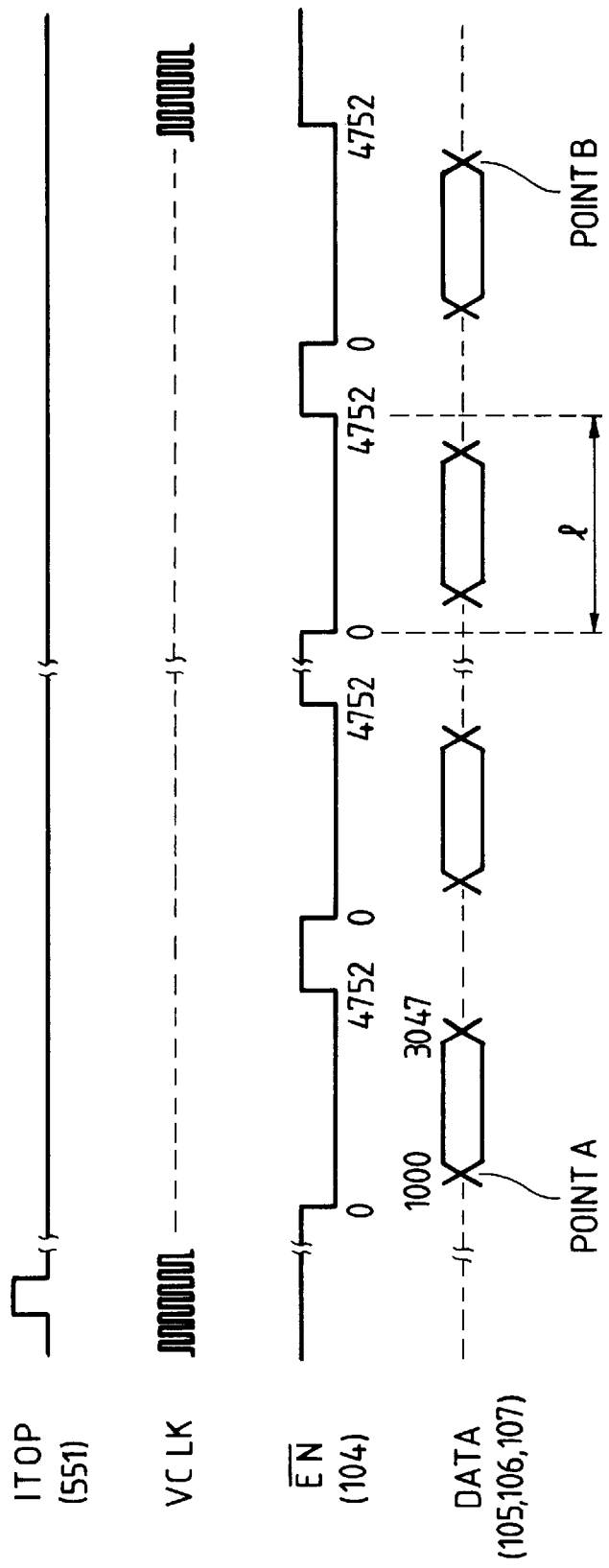
FIG. 9 is an output timing chart from an interface unit to an image memory apparatus of the embodiment.

The video interface 101 outputs not only the area information but also a VCLK signal, an ITOP signal 551, an $\overline{EN}$ signal 104 as a signal from an area signal generation circuit 51, and the like to the image memory apparatus 3 together with the image data. FIG. 9 shows a timing chart for those output signal lines.

As shown in FIG. 9, by pressing a start button of the operation unit 20, the stepping motor 14 is driven and the original scanning unit 11 starts the scanning. When the scanning unit 11 reaches the front edge of the original, the ITOP signal 551 is set to the "1" level. The scanning unit 11 reaches the area designated by the digitizer 16. During the scanning of the designated area, the $\overline{EN}$ signal 104 is held at the "1" level. Therefore, it is sufficient to input the read color image data (DATA 105, 106, and 107) when the $\overline{EN}$ signal 104 is set to "1".

Figure 3:
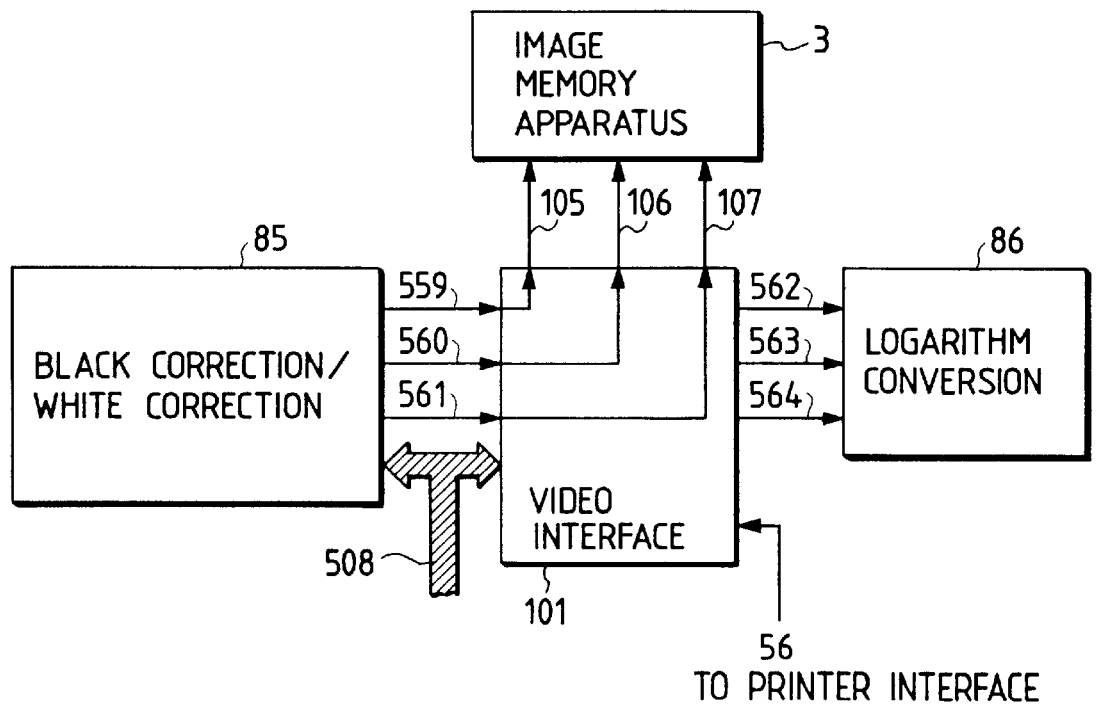
Figure 4:
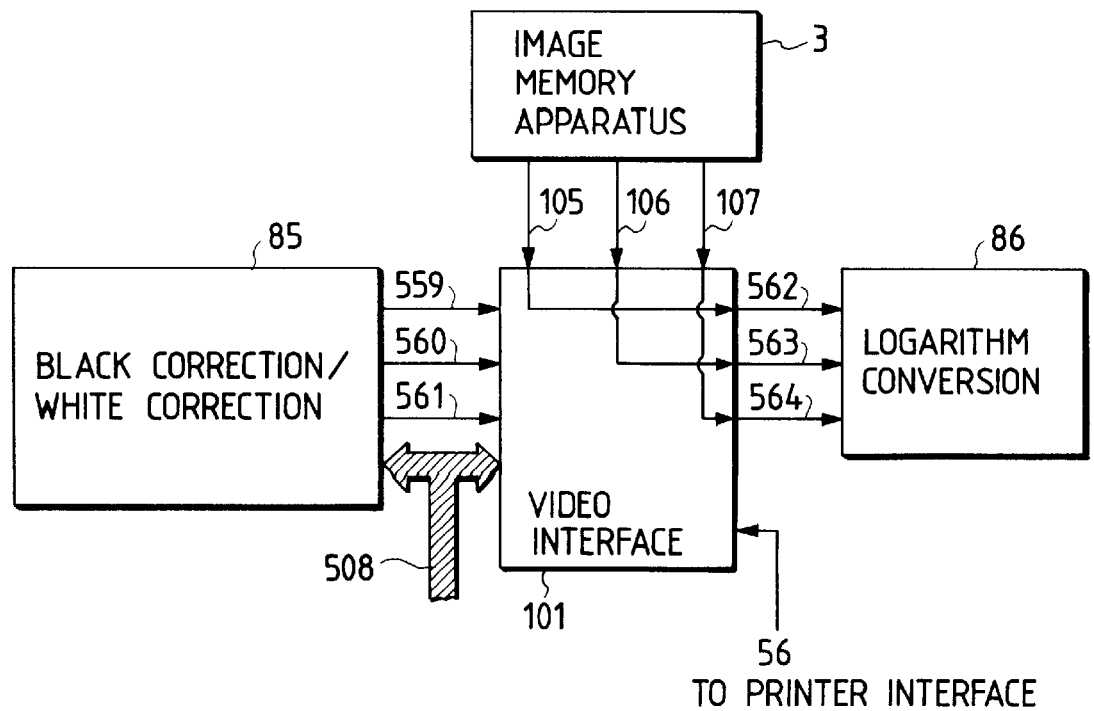

As shown in FIG. 9 mentioned above, in the transfer of the image data from the color reader 1, by controlling the video interface 101 in a manner as shown in FIG. 3, the R data 105, G data 106, and B data 107 are transmitted to the image memory apparatus 3 in a real-time manner synchronously with the ITOP signal 551, control signal of the $\overline{EN}$ signal 104, and VCLK signal.

A practical method of storing by the image memory apparatus 3 on the basis of the image data and the control signal will now be described with reference to FIGS. 10A and 10B.

A connector 4550 is connected to the video interface 101 of the color reader 1 through a cable. The R data 105, G data 106, and B data 107 are connected to a selector 4250 through signal lines 9430R, 9430G, and 9430B, respectively. The VCLK signal, $\overline{EN}$ signal 104, and ITOP signal 551 which are sent from the video interface 101 pass through a signal line 9450 and are directly input to a system controller 4210. On the other hand, prior to reading the original, the area information designated by the digitizer 16 passes through a communication line 9460 and is input to a reader controller 4270. The area information is output from the reader controller 4270 to a CPU 4360 through a CPU bus 9610. The R data 105, G data 106, and B data 107 which were input to the selector 4250 through the signal lines 9430R, 9430G, and 9430B are selected by the selector 4250 and, thereafter, they are output to signal lines 9420R, 9420G, and 9420B and are input to FIFO memories 4050R, 4050G, and 4050B, respectively.

Figure 11:
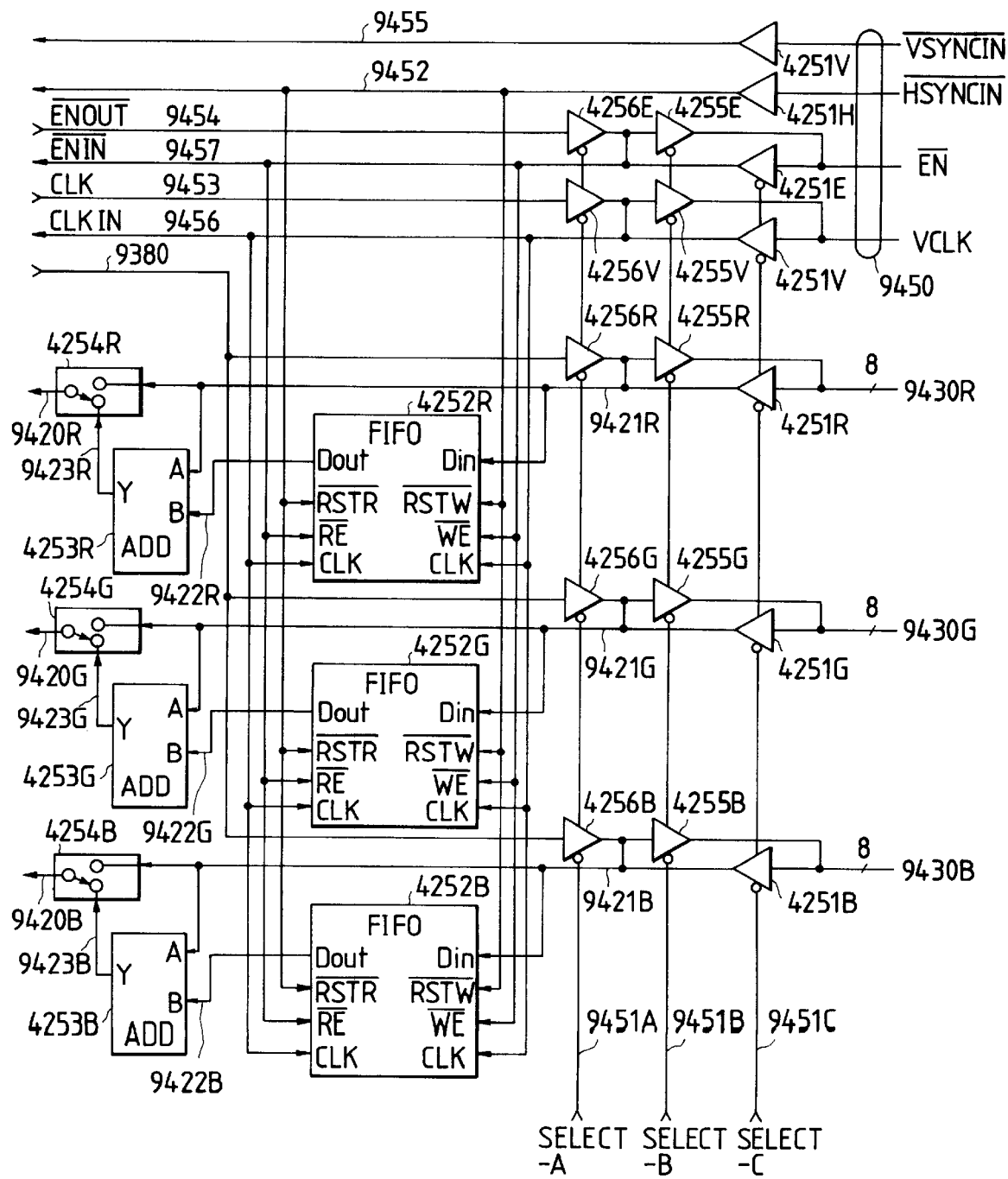
FIG. 11 is a detailed diagram of a selector unit of the image memory apparatus of the embodiment.

FIG. 11 shows a detailed constructional diagram of the selector 4250.

As shown in the diagram, in the case of storing the image data from the color reader 1 to the image memory apparatus 3, a control signal SELECT-A 9451A from the system controller 4210 is set to 1, a control signal SELECT-B 9451B is set to 1, and a control signal SELECT-C 9451C is set to 0. Only tristate buffers 4251E, 4251V, 4251R, 4251G, and 4215B are made operative and other tristate buffers 4255E, 4255V, 4255R, 4255G, 4255B, 4256E, 4256V, 4256R, 4256G, and 4256B are set to the high impedance, respectively.

Similarly, the VCLK signal and $\overline{EN}$ signal in the control signal 9450 are also selected by the SELECT signals 9451A, 9451B, and 9451C. In the case of storing the image data from the color reader 1 into the image memory apparatus 3, as shown in FIG. 11, the VCLK signal and $\overline{EN}$ signal are the signals which are output from the color reader 1. Only the tristate buffets 4251E and 4251V are made operative. Thus, those signals pass through signal lines CLKIN 9456 and $\overline{ENIN}$ 9457 and are input to the system controller 4210.

On the other hand, control signals $\overline{VSYNCIN}$ 9455 and $\overline{HSYNCIN}$ 9452 are directly input from the connector 4550 to the system controller 4210.

Further, the selector 4250 also has the function to average the image data from the color reader 1. The signals 9430R, 9430G, and 9430B which are input from the color reader pass through signal lines 9421R, 9421G, and 9421B and are input to FIFO memories 4252R, 4252G, and 4252B.

Outputs from the FIFO memories 4252R, 4252G, and 4252B are the signals which are delayed by one main scanning period than the image data 9421R, 9421G, and 9421B and pass through signal lines 9422R, 9422G, and 9422B and are input to adders 4253R, 4253G, and 4253B. The signals 9421R, 9421G, and 9421B from the tristate buffers 4251R, 4251G, and 4251B are input to the adders 4253R, 4253G, and 4253B. The adders 4253R, 4253G, and 4253B each calculate the mean value of total four pixels comprising two pixels in the main scanning direction and two pixels in the subscanning direction and output to signal lines 9423R, 9423G,, and 9423B.

Selectors 4254R, 4254G, and 4254B select either the image signals 9421R, 9421G, and 9421B from the color reader 1 or the weighted mean signals 9423R, 9423G, and 9423B and output the signals 9420R, 9420G, and 9420B into the FIFO memories 4050R, 4050G, and 4050B.

The system controller 4210 transfers only the effective area of the image among the image data 9420R, 9420G, and 9420B from the selectors 4254R, 4252G, and 4254B into the FIFO memories 4050R, 4050G, and 4050B. On the other hand, at this time, the system controller 4210 also simultaneously executes the trimming process and the variable magnifying process.

Further, the FIFO memories 4050R, 4050G, and 4050B eliminate the differences of the clocks between the color reader 1 and the image memory apparatus 3.

The above processes in the embodiment will now be described hereinbelow with reference to a circuit diagram of FIG. 12 and a timing chart of FIG. 13.

That is, before the data are transferred from the selectors 4254R, 4254G, and 4254B into the FIFO memories 4050R, 4050G, and 4050B, the effective area in the main scanning direction of the area designated by the digitizer 16 is written into comparators 4232 and 4233 through the CPU bus 9610.

A start address in the main scanning direction of the area designated by the digitizer 16 is set into the comparator 4232, while a stop address is set into the comparator 4233.

On the other hand, in the subscanning direction of the area designated by the digitizer 16, the CPU bus 9610 side is selected and is made effective by controlling a selector 4213. The "0" data is written into the effective area of the area designated in an RAM 4212, while the "1" data is written into the ineffective area.

In the variable magnifying process in the main scanning direction, a variable magnification ratio is set into a rate multiplier 4234 through the CPU bus 9610. The variable magnifying process in the subscanning direction can be realized by the data which is written into the RAM 4212.

Figure 13:
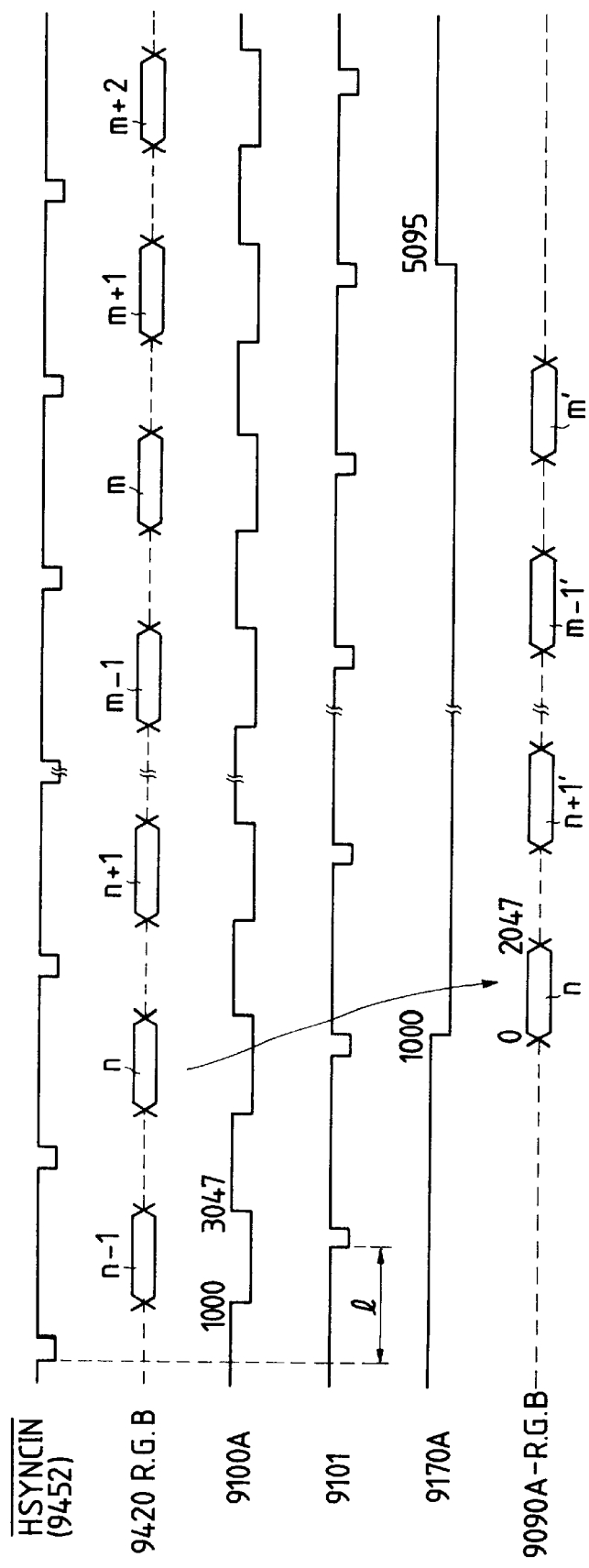
FIG. 13 is a timing chart for data storage from the system controller unit to the FIFO memory in the equal size mode of the embodiment.

FIG. 13 is a timing chart in the case of executing the trimming process. As mentioned above, in the case of storing only the area designated by the digitizer 16 into the memory (trimming process), the trimming position in the main scanning direction is set into the comparators 4232 and 4233 and the trimming position in the subscanning direction is written into the RAM 4212 by the CPU by switching the selector 4213 to the side of the CPU bus 9610 ((for instance) trimming area: main scan 1000 to 3047; subscan 1000 to 5095).

For a trimming interval signal 9100 in the main scanning direction, when a counter 4230 operates synchronously with the $\overline{\text{HSYNCIN}}$ signal 9452 and CLKIN signal 9456 and a counter output 9103 is set to 1000, the output of the comparator 4232 is set to 1 and a Q output of a flip-flop 4235 is set to 1. Subsequently, when the counter output 9103 is set to 3047, the output of the comparator 4233 is set to 1 and the output of the flip-flop 4235 is set from 1 to 0. On the other hand, in the timing chart of FIG. 13, since the equal size magnifying process is executed, an output of the rate multiplier 4234 is set to 1. The image data in addresses 1000 to 3047 in the color image data which is input into the FIFO memories 4050R, 4050G, and 4050B by the trimming interval signal 9100 is written into the FIFO memories 4050R, 4050G, and 4050B.

On the other hand, a comparator 4231 outputs a signal 9102 which is delayed by t pixels than the $\overline{\text{HSYNCIN}}$ signal 9452. As mentioned above, the providing the phase difference between the signals which are input to $\overline{\text{RSTW}}$ and $\overline{\text{RSTR}}$ input terminals of each of the FIFO memories 4050R, 4050G, and 4050B, the difference between the periods of the CLKIN signal 9456 and the CLK signal 9453 which are input to the FIFO memories 4050R, 4050G, and 4050B is eliminated.

For the trimming in the subscanning direction, a counter 4214 side is first selected and is made effective by controlling the selector 4213 and an interval signal 9104 synchronized with the $\overline{\text{VSYNCIN}}$ signal 9455 and $\overline{\text{HSYNCIN}}$ signal 9452 is output from the RAM 4212. The interval signal 9104 is synchronized with the signal 9102 by a flip-flop 4211 and is input to a reset read ($\overline{\text{RE}}$) input terminal of each of the FIFO memories 4050R, 4050G, and 4050B. That is, the image data stored in the FIFO memories 4050R, 4050G, and 4050B is output (n'-m') only for the interval when a trimming signal 9101 is set to "0".

Although only the trimming process has been described above, the variable magnifying process can be also executed simultaneously with the trimming. To execute the variable magnifying process in the main scanning direction, a variable magnification ratio is set into the rate multiplier 4234 through the CPU bus 9610. On the other hand, the variable magnifying process in the subscanning direction can be realized on the basis of the data which is written into the RAM 4212.

Figure 14:
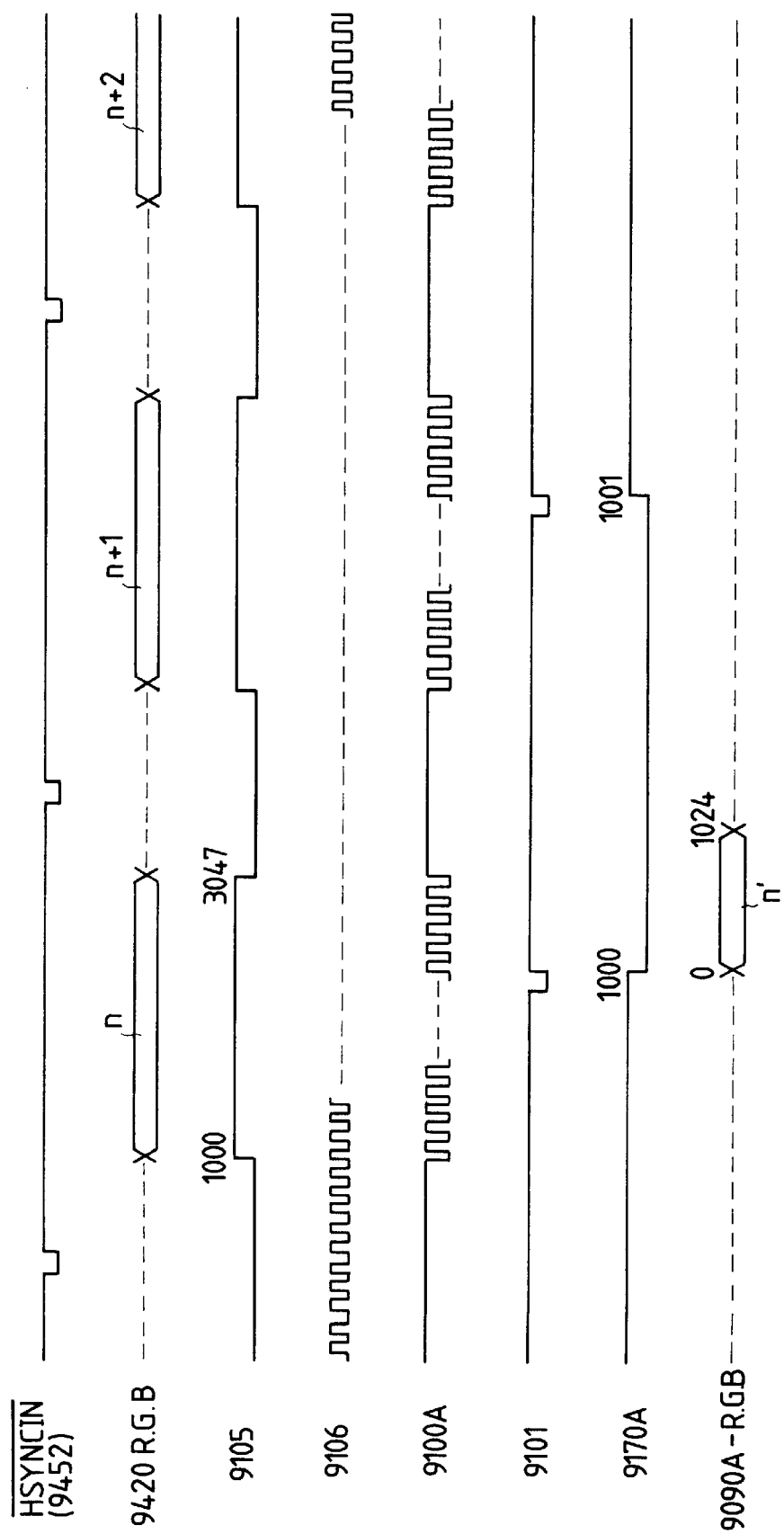
FIG. 14 is a timing chart for data storage from the system controller unit to the FIFO memory in the variable magnification mode of the embodiment.

FIG. 14 shows a timing chart in the case where the trimming process and the variable magnifying process (50%) were executed.

FIG. 14 is a diagram showing an example of the timing chart in the case where the image data from the selectors 4254R, 4254G, and 4254B are reduced by 50% by executing the variable magnifying process and the reduced image data are transferred to the FIFO memories 4050R, 4050G, and 4050B.

Figure 12:
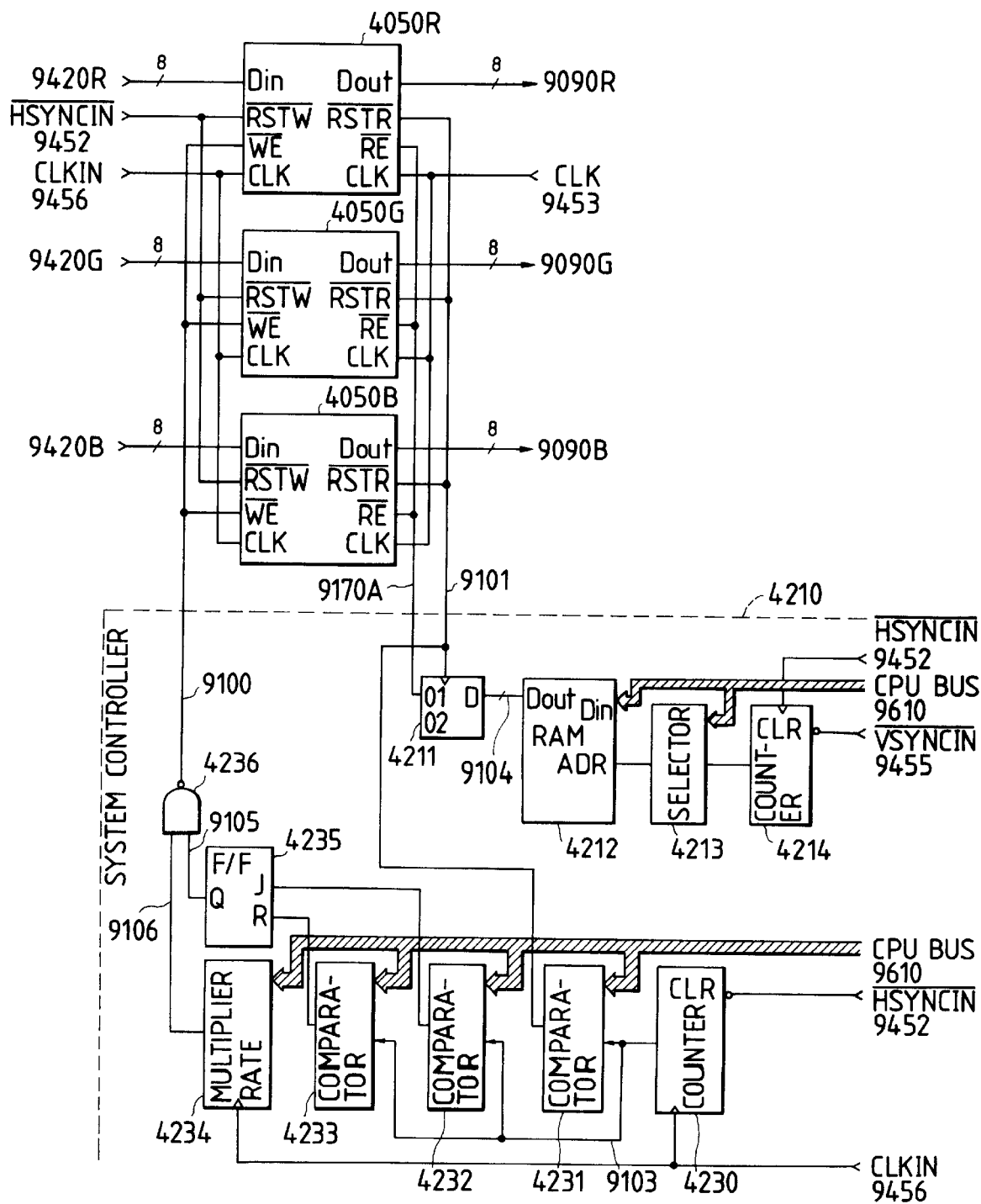
FIG. 12 is a detailed diagram of a system controller unit and an FIFO memory of the image memory apparatus of the embodiment.

The variable magnification ratio of 50% reduction is set into the rate multiplier 4234 in FIG. 12 through the CPU bus 9610. At this time, an output 9106 of the rate multiplier 4234 has a waveform such that "0" and "1" are repeated every pixel in the main scanning direction as shown in FIG. 14. The AND signal 9100 of the output signal 9106 of the rate multiplier 4234 and an interval signal 9105 formed by the comparators 4232 and 4233 is used to control the write enable operation to the FIFO memories 4050R, 4050G, and 4050B, thereby executing the reduction.

On the other hand, for the variable magnifying process in the subscanning direction, as shown in FIG. 14, by setting the write data (read enable signal to the FIFO memories 4050R, 4050G, and 4050B) to the RAM 4212 into "1" (inhibition of the reading operation) in the image data effective area, only the image data which was reduced by 50% is sent to image memories 4060R, 4060G, and 4060B. In the case of FIG. 14, the read enable signal 9101 is alternately repetitively set to the "1" and "0" data, thereby executing the reduction of 50%.

That is, in the trimming process and variable magnifying process in the main scanning direction, the write enable operations of the FIFO memories 4050R, 4050G, and 4050B are controlled. In the trimming process and variable magnifying process in the subscanning direction, the read enable operations of the FIFO memories 4050R, 4050G, and 4050B are controlled.

The image data transfer from the FIFO memories 4050R, 4050G, and 4050B to the memories 4060R, 4060G, and 4060B is executed by a counter 0 (4080-0) and control line 9101.

The control line 9101 corresponds to the read enable signal of the FIFO memories 4050R, 4050G, and 4050B, the enable signal of the counter 4080-0, and the write enable signal of the memories 4060R, 4060G, and 4060B.

When the control line 9101 is set to "0", the image data which was read out of the FIFO memories 4050R, 4050G, and 4050B passes through tristate buffers 9090R, 9090G, and 9090B and is input to the memories 4060R, 4060G, and 4060B. At this time, the enable signal of the counter 4080-0 is also set to "0". A count-up signal 9120-0 is output from the counter 4080-0 synchronously with a CLK signal 9453 and passes through a selector 4070 and is input to an ADR 9110 of each of the memories 4060R, 4060G, and 4060B.

At this time, since the write enable $\overline{WE}$ signal 9101 of the memories 4060R, 4060G, and 4060B is also set to "0", the image data 9090R, 9090G, and 9090B which are input to the memories 4060R, 4060G, and 4060B are stored.

In the embodiment, the memory capacity of each color is set to 1 Mbytes. Therefore, by reducing the image data of the read area in FIG. 8 by 50%, the read image data is converted into the data of the maximum capacity of each memory provided in the image memory apparatus 3 and is stored.

On the other hand, in the above embodiment, the CPU 4360 calculates the effective area from the information of the area of the original of the A3 size which was designated by the digitizer 16. The CPU 4360 then sets the data corresponding to the comparators 4231 to 4233, rate multiplier 4234, and RAM 4212.

In the embodiment, since the capacity of the read image data is larger than the capacity of the image memory provided in the apparatus, the reducing process is executed and the image data is converted into the small data of the capacity which can be stored and, thereafter, it is stored into the image memory. However, if the capacity of the read image data is smaller than the image memory capacity, by setting a CLR signal 9171 in FIG. 15 to "1", a plurality of image surfaces can be simultaneously stored into the image memory. In this case, the trimming data is set into the comparators 4232 and 4233 to control the writing of the area designated by the digitizer 16 to the memory and the equal size mode is set into the rate multiplier 4234. On the other hand, as the write data to the RAM 4212, all of the image effective areas are set to "0" and the other areas are set to "1" and the equal size is set.

In order to store the read image data into the memory while keeping the aspect ratio (the ratio of the vertical size to the horizontal size) of the read image, the CPU 4360 first obtains the number "x" of effective pixels from the area data sent from the digitizer 16. Then, the CPU obtains a reduction ratio "z" from the maximum capacity "y" of the image memory by the following equation.

$$\frac{y}{x} \times 100 = z$$

Thus, (1) when z≧100, 100% is set into the rate multiplier 4234, all of the effective image areas in the RAM 4212 are set to "0", and the image data is stored in the equal size mode, and (2) when z<100, z% of the reduction is set into the rate multiplier 4234, the image data in the RAM 4212 is reduced by z%, and the reduced image data is stored into the maximum capacity of the memory while keeping the aspect ratio.

In this case as well, as the data which is written into the RAM 4212, it is sufficient to properly write the data of "1" and "0" in correspindence to the reduction ratio "z".

By controlling as mentioned above, an arbitrary variable magnifying process can be easily executed by merely controlling the inside of the image memory apparatus 3 while keeping the aspect ratio of the input image. The read image can be effectively recognized. Further, the using efficiency of the memory capacity can be set to the maximum value.

<Description of the interface of the SV record regenerating apparatus>

As shown in FIG. 1, the system of the embodiment can not only store the video image from the SV record regenerating apparatus 31 into the image memory apparatus 3 but also output to the monitor television 32 or the color printer 2. The image processing apparatus 3 also executes the handling of the input image.

Inputting of the video image from the SV record regenerating apparatus 31 to the image memory apparatus 3 will now be described hereinbelow.

First, the inputting control of the video image from the SV record regenerating apparatus 31 to the image memory apparatus 3 will be first described hereinbelow with reference to block constructional diagrams of the image memory apparatus 3 of FIGS. 10A and 10B.

The video image from the SV record regenerating apparatus 31 is input in a form of an NTSC composite signal 9000 through an analog interface 4500 and is separated into four signals 9015R, 9015G, 9015B, and 9015S (these signals are generally referred to as 9015) comprising separate R, GI B signals and a composite SYNC signal by a decoder 4000.

On the other hand, the decoder 4000 also decodes Y (luminance)/C (chrominance) signals 9010 from an analog interface 4510 in a manner similar to the above. Signals 9020R, 9020G, 9020B, and 9020S are input to a selector 4010 in a form of the separate R, G, and B signals and the composite SYNC signal. A switch 4530 is provided to control the selector 4010 for selecting and switching either the input signals 9020R, 9020, 9020B, and 9020S or the signals 9015R, 9015G, 9015B, and 9015S. When the switch 4530 is open, the signals 9020R to 9020S are selected. When the switch 4530 is closed, the signals 9015R to 9015S are selected.

Separate R, G, and B signals 9050R, 9050G, and 9050B selected by the selector 4010 are analog/digital converted into digital signals by A/D converters 4020R, 4020G, and 4020B.

On the other hand, a selected composite SYNC signal 9050S is input to a TBC/HV separation circuit 4030. A clock signal 9060C, a horizontal sync signal 9060H, and a vertical sync signal 9060V are produced from the composite SYNC signal 9050S by the TBC/HV separation circuit 4030. Those sync signals are supplied to the system controller 4210.

The TVCLK signal 9060C which is output from the TBC/HV separation circuit 4030 in the embodiment is the clock signal of 12.25 MHz the $\overline{TVHSYNC}$ signal 9060H is the signal of a pulse width of 63.5 μsec, and the $\overline{TVVSYNC}$ signal 9060V is the signal of a pulse with of 16.7 msec.

The FIFO memories 4050R, 4050G, and 4050B are reset by the $\overline{TVHSYNC}$ signal 9060H and data 9060R, 9060G, and 9060B are written into the FIFO memories from address "0" synchronously with the TVCLK signal 9060C. At this time, the writing operations to the FIFO memories 4050R, 4050G, and 4050B are executed when the $\overline{WE}$ signal 9100 which is output from the system controller 4210 is set to "1".

The writing control of the FIFO memories 4050R, 4050G, and 4050B by the $\overline{WE}$ signal 9100 will be described in detail hereinbelow.

The SV record regenerating apparatus 31 in the embodiment is based on the NTSC standard. Therefore, when the video image from the SV record regenerating apparatus 31 is digitized, the image surface capacity is set to 640 pixels (in the horizontal direction: H)×480 pixels (in the vertical direction: V). Therefore, the CPU 4360 of the image memory apparatus 3 first writes set values into the comparators 4232 and 4233 so that the number of pixels in the main scanning direction is set to 640. Next, the CPU 4360 switches the input signals of the selector 4213 to the CPU bus 9610 side and writes "0" data as many as 480 pixels in the subscanning direction into the RAM 4212.

On the other hand, the data of 100% is set into the rate multiplier 4234 to set the magnification in the main scanning direction.

In the case of storing the image data from the SV record regenerating apparatus 31 into the memories 4060R, 4060G, and 4060B, the system controller 4210 connects the $\overline{\text{TVVSYNC}}$ signal 9060V, $\overline{\text{TVHSYNC}}$ signal 9060H, and TVCLK signal 9060C which are output from the TBC/HV separation circuit 4030 to the $\overline{\text{VSYNCIN}}$ signal 9455, $\overline{\text{HSYNCIN}}$ signal 9452, and CLKIN signal 9456 shown in FIG. 12.

As mentioned above, by setting the image control signal to the interface side of the SV record regenerating apparatus, the data of the single main scan of the video images of the output signals 9060R, 9060G, and 9060G from the A/D converters 4020R, 4020G, and 4020B are stored into the FIFO memories 4050R, 4050G, and 4050B at the equal size.

On the other hand, in the case of reducing the input SV video images and storing into the FIFO memories 4050R, 4050G, and 4050B, the reduction ratio is set into the rate multiplier 4234 and the data in the RAM 4212 in the image effective area is set to "1" in accordance with the reduction ratio, so that the video image can be reduced.

The data transfer from the FIFO memories 4050R, 4050G, and 4050B to the memories 4060R, 4060G, and 4060B is executed in a manner similar to the case of the data writing control from the color reader 1 to the memories 4060R, 4060G, and 4060B mentioned above.

On the other hand, the SV record regenerating apparatus 31 in the embodiment is based on the NTSC standard. The case where the aspect ratio of the digital image in the main scanning direction to the subscanning direction is set to 4:3 has been described as an example. However, by rewriting the contents of the comparators 4232 and 4233 and RAM 4212 in FIG. 12, the invention can be also applied to the aspect ratio of 16:9 of the HDTV standard which is presumed as the standard of the future television.

In addition, the memory capacity in the embodiment has been set to 2 Mbytes. However, since the capacity of one image surface of the NTSC standard is set to about 0.3 Mbytes, the images of six image surfaces can be stored. Such storage of six image surfaces can be also realized by setting the $\overline{\text{CLR}}$ signal 9171 shown in FIG. 15 to "1".

In the case of the HDTV standard of 1840 pixels (in the main scanning direction)×1035 pixels (in the subscanning direction), by setting the $\overline{\text{CLR}}$ signal 9171 to "0", one image surface can be stored into the memory of 2 Mbytes.

Further, the invention can also cope with the realization of the high band of the video apparatuses. That is, by raising the TVCLK clocks which are output from the TBC/HV separation circuit 4030 in the embodiment, the number of read pixels in the main scanning direction can be increased.

<Reading process from the image memory apparatus>

The reading process of the image data from the memories 4060R, 4060G, and 4060B of the image memory apparatus 3 described above will now be explained.

A command input and the like in the case where an image is formed by the color printer 2 on the basis of the image outputs from the memories are mainly executed by the digitizer 16 shown in FIG. 7 mentioned above.

In FIG. 7, reference numeral 428 denotes an entry key for allowing the color printer 2 to form an image onto a recording paper in accordance with the size of recording paper on the basis of the image data from the memories 4060R, 4060G, and 4060B. Reference numeral 429 indicates an entry key for allowing an image to be formed at the position designated by the coordinate detecting plate 420 of the digitizer 16 and by the point pen 421.

First, explanation will be made with respect to an embodiment in which an image is formed in accordance with the size of recording paper. Then, an embodiment in which an image is formed in the area designated by the digitizer will be described.

<Image forming process corresponding to the size of recording paper>

In the embodiment, as shown in FIG. 1, the color printer 2 has two cassette trays 735 and 736 and two kinds of recording papers are set. In the example, the recording papers of the A4 size are set to the upper stage and the recording papers of the A3 size are set to the lower stage. An instruction to select the recording papers is input by a liquid crystal touch panel in the operation unit 20. The following description relates to the case of forming a plurality of images onto the recording paper of the A4 size.

Prior to forming an image, by inputting the read image data from the color reader 1 mentioned above to the image memory apparatus 3, total sixteen image data comprising "image 0" to "image 15" are read out of the color reader 1 and are stored into the image memories 4060R, 4060G, and 4060B, which will be explained hereinlater, as shown in, e.g., FIG. 16, respectively.

Figure 17:
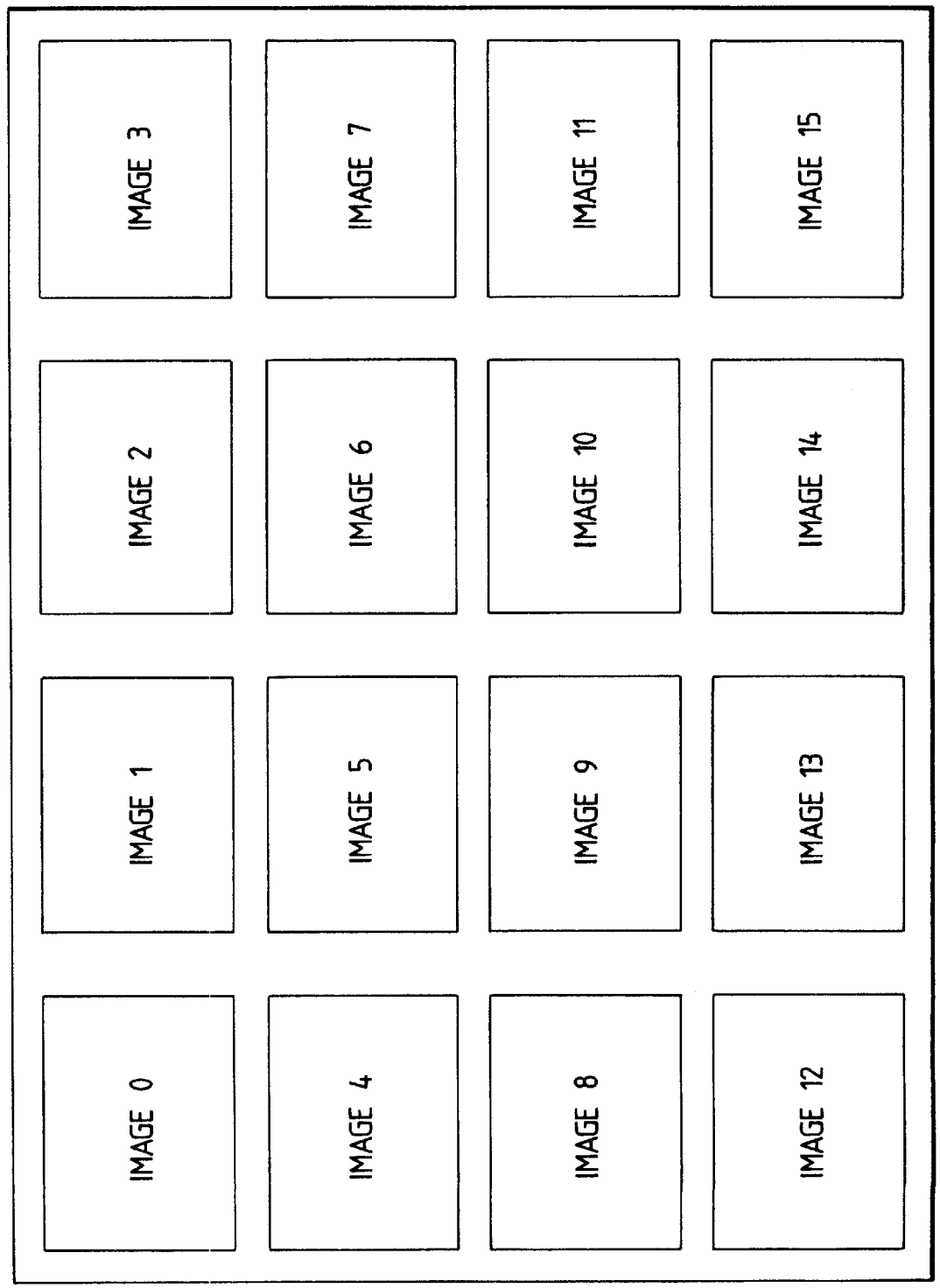
FIG. 17 is a diagram showing an image formation layout of the embodiment.

Next, the entry key 428 of the digitizer 16 is pressed. Thus, the CPU (not shown) detects such a key input and automatically sets the image forming position to the recording paper of the A4 size. In the case of forming the image of No. 16 shown in FIG. 16, for instance, the image forming position is set as shown in FIG. 17.

The above image forming process in the embodiment will now be described in detail hereinbelow with reference to the block diagrams of FIGS. 10A and 10B and a timing chart shown in FIG. 18.

An ITOP signal 511 which is sent from the color printer 2 shown in FIG. 2 to the color reader 1 through the printer interface 56 is input to the video interface 101 in the video processing unit 12. The ITOP signal is then sent from the video interface 101 to the image memory apparatus 3. The image memory apparatus 3 starts the image forming process in response to the ITOP signal 551. Each image sent to the image memory apparatus 3 is formed under the control of the system controller 4210 shown in FIGS. 10A and 10B in the image memory apparatus 3.

In FIGS. 10A and 10B, an output of the counter 0 (4080-0) is selected by the selector 4070. The memories 4060R, 4060G, and 4060B are accessed to read by a memory address line 9110. Due to the access, the image data stored in the memories 4060R, 4060G, and 4060B are read out. Image signals 9160R, 9160G, and 9160B which were read out of the memories are transferred to look-up tables (LUT) 4110R, 4110G, and 4110B, by which logarithm conversion to match with the relative luminous efficiency characteristics of the human eyes is executed. Conversion data 9200R, 9200G, and 9200B from the LUT are input to a masking/black extraction/UCR circuit 4120. The color correction of the color image signals in the image memory apparatus 3 is executed by the masking/black extraction/UCR circuit 4120 and the UCR/black extraction processes are also executed in the black recording mode.

A sequential image signal 9210 from the masking/black extraction/UCR circuit 4120 is separated every image by a selector 4130. The separated signals are input to FIFO memories 4140-0 to 4140-3. The images which have sequentially been arranged so far can be processed in parallel by the functions of the FIFO memories 4140-0 to 4140-3.

Figure 18:
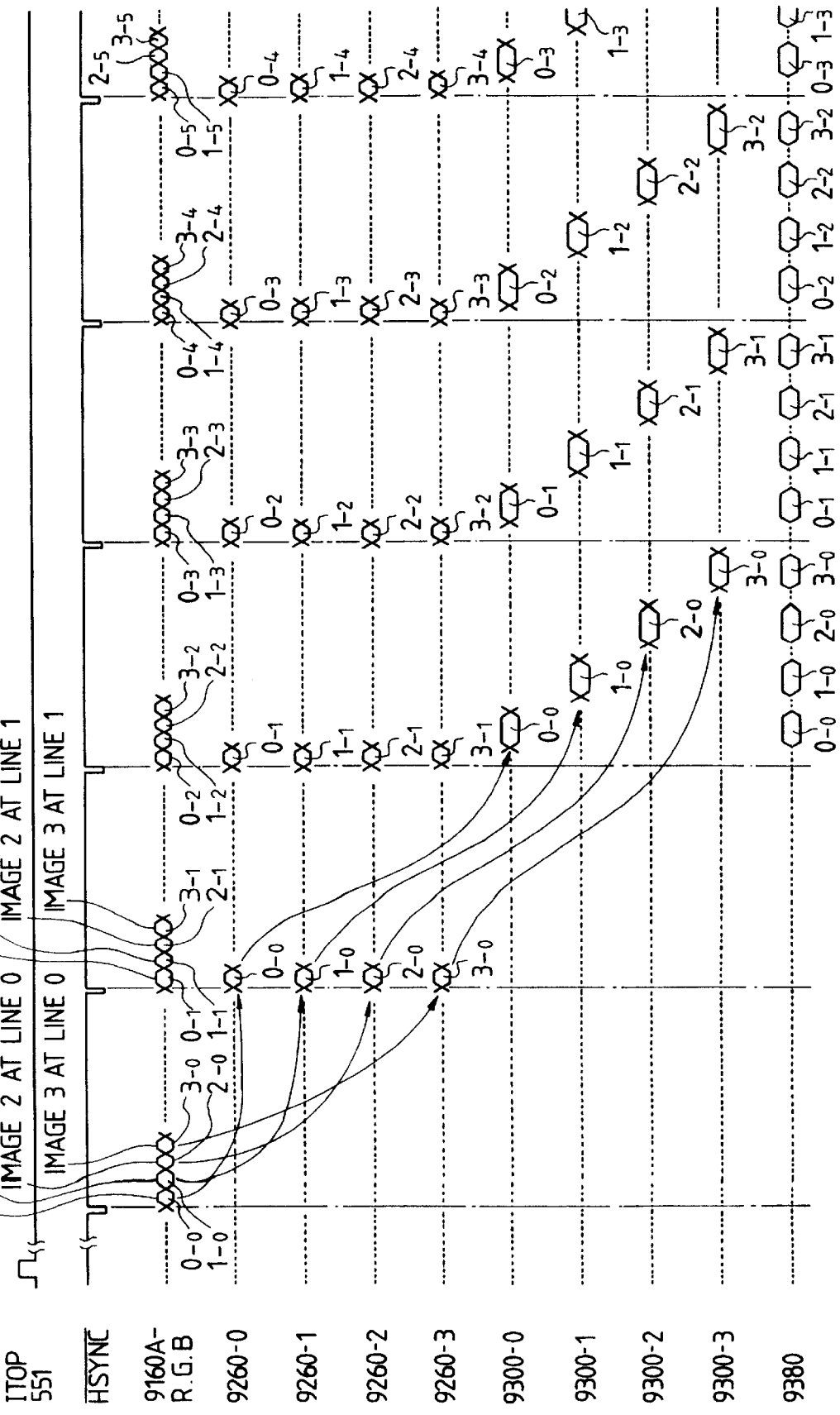
FIG. 18 is a timing chart for the image forming process according to the image formation layout of FIG. 17.

The relations among the readout image signals 9160R, 9160G, and 9160B from the memories and parallel output image data 9260-0 to 9260-3 from the FIFO memories are shown in the upper stage portion in FIG. 18. As shown in the diagram, the image data 9260-0 to 9260-3 corresponding to the readout image data at the line "0" of "image 0" to "image 3" which are necessary to form an image of one line in the main scanning direction can be all processed in parallel.

The parallel image signals 9260-0 to 9260-3 are input to enlargement/interpolation circuits 4150-0 to 4150-3 at the next stage. The circuits 4150-0 to 4150-3 are controlled by the system controller 4210 so as to obtain a layout of the images shown in FIG. 17 and execute the enlargement/interpolation processes as shown by signals 9300-0 to 9300-3 in FIG. 18. In the embodiment, the primary interpolating method is used.

The interpolated signals 9300-0 to 9300-3 are input to a selector 4190. The image data which were processed in parallel so far are again converted into the serial image data signal. An image signal 9330 converted into the serial image data by the selector 4190 is subjected to an edge emphasizing process and a smoothing process by an edge filter circuit 4180. The processed image signal passes through an LUT 4200 and is input to the selector 4250 through a signal line 9380.

The signals input to the selector 4250 pass through the tristate buffers 4256R, 4256G, 4256B, 4255R, 4255G, and 4255B and are output to the connector 4550 through the signal lines 9430R, 9430G, and 9430B.

Similarly, an $\overline{\text{ENOUT}}$ signal 9454 and the CLK signal 9453 which are output from the system controller 4210 also pass through the tristate buffers 4256E, 4256V, 4255E, and 4255V and are output to the connector 4550 through the signal line 9450.

At this time, the control lines SELECT-A 9451A, SELECT-B 9451-B, and SELECT-C 9451-C to control the gates of the tristate buffers shown in FIG. 11 are set to "0", "0" and "1", respectively.

After completion of the formation of all of the image data of "image 0" to "image 3", the images are then sequentially formed in accordance with the order of "image 4" to "image 7", "image 8" to "image 11", and "image 12" to "image 15". In this manner, sixteen images of "image 0" to "image 15" shown in FIG. 17 are formed.

<Image formation by the layout at arbitrary positions>

Although the control in which the images are developed so that they can be automatically formed as shown in FIG. 17 and the images are formed has been described above, the embodiment is not limited to the above example but images can be also formed by developing arbitrary images to arbitrary positions.

Figure 20:
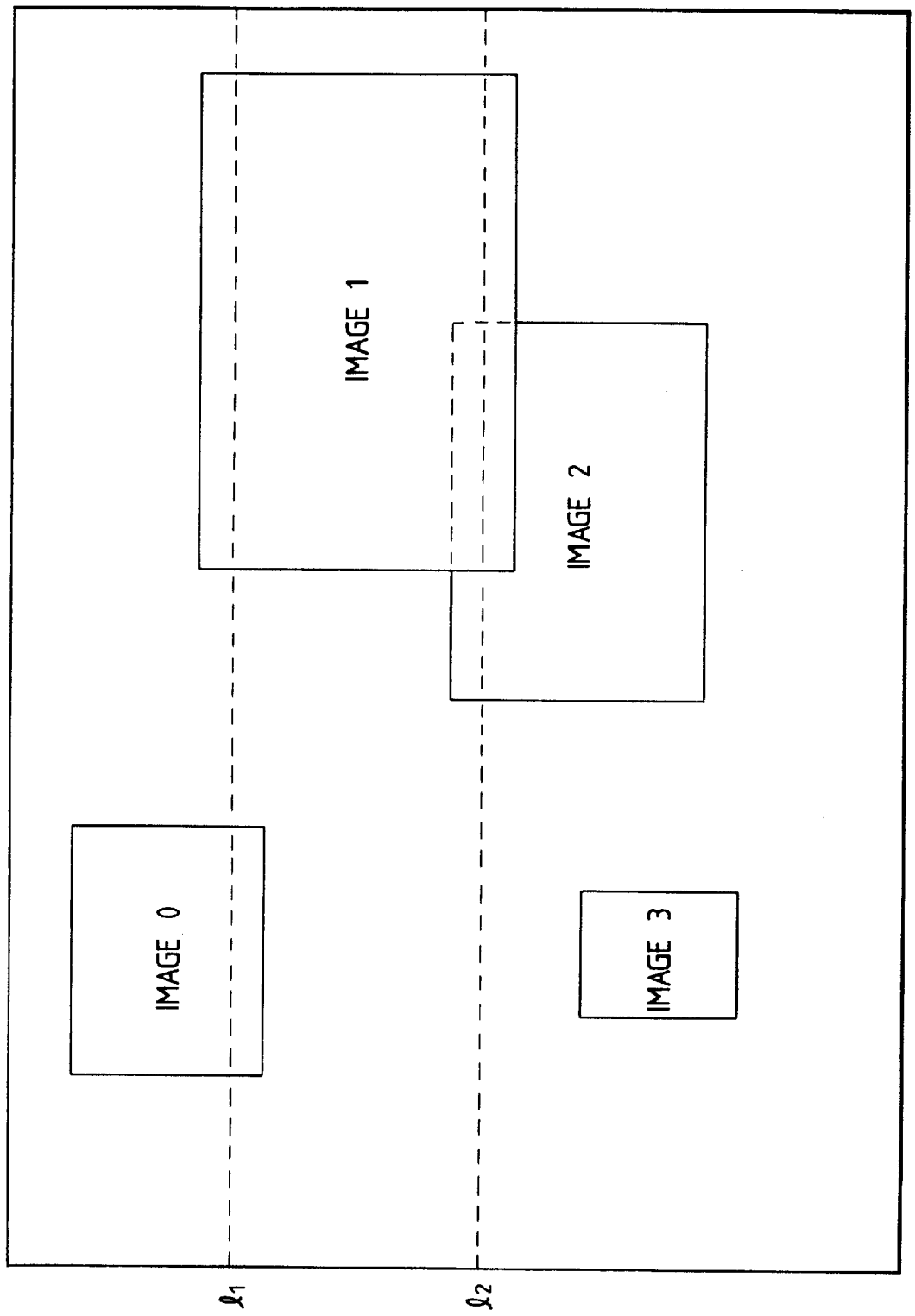
FIG. 20 is a diagram showing an arbitrary layout state of the image data shown in FIG. 19.

An example of such a case will now be described hereinbelow with respect to the case where "image 0" to "image 3" shown in FIG. 20 are developed as shown in the diagram and the images are formed.

Figure 19:
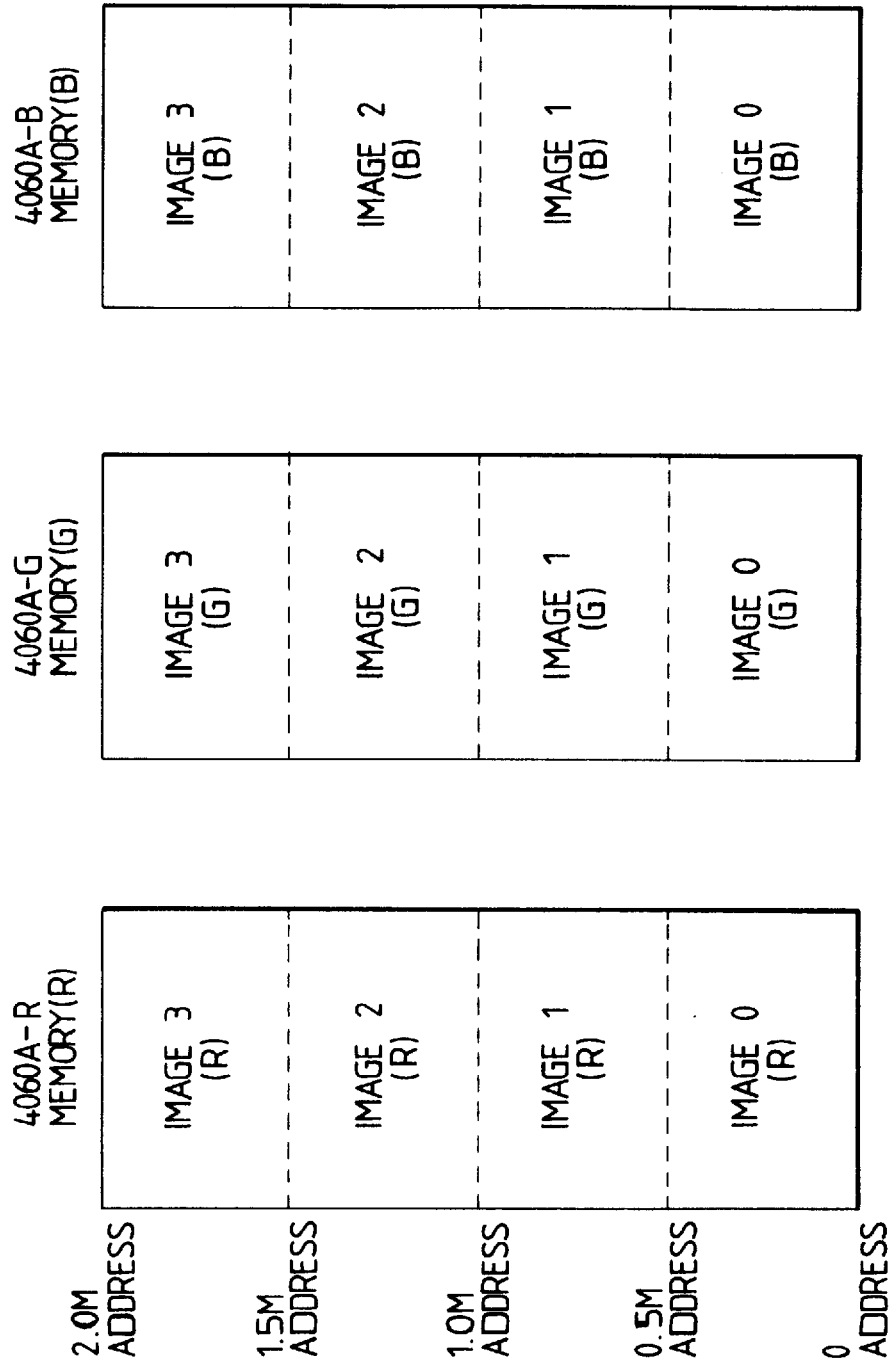
FIG. 19 is an arrangement diagram of image data in memories of another image memory apparatus of the embodiment.

First, four image data which were read out from the color reader 1 are stored into the image memories 4060R, 4060G, and 4060B by a control similar to the foregoing image input control to the memories as shown in FIG. 19. Next, by pressing the entry key 429 of the digitizer 16, the system waits for the input of the designated image forming positions of the images read out from the digitizer 16.

By operating the point pen 421, desired developing positions are designated and input by the coordinate detecting plate 420. For instance, the developing areas are designated and input as shown in FIG. 20.

The image forming process in this case will now be described hereinbelow with reference to block constructional diagrams of FIGS. 10A and 10B and timing charts shown in FIGS. 21 and 22.

Figure 21:
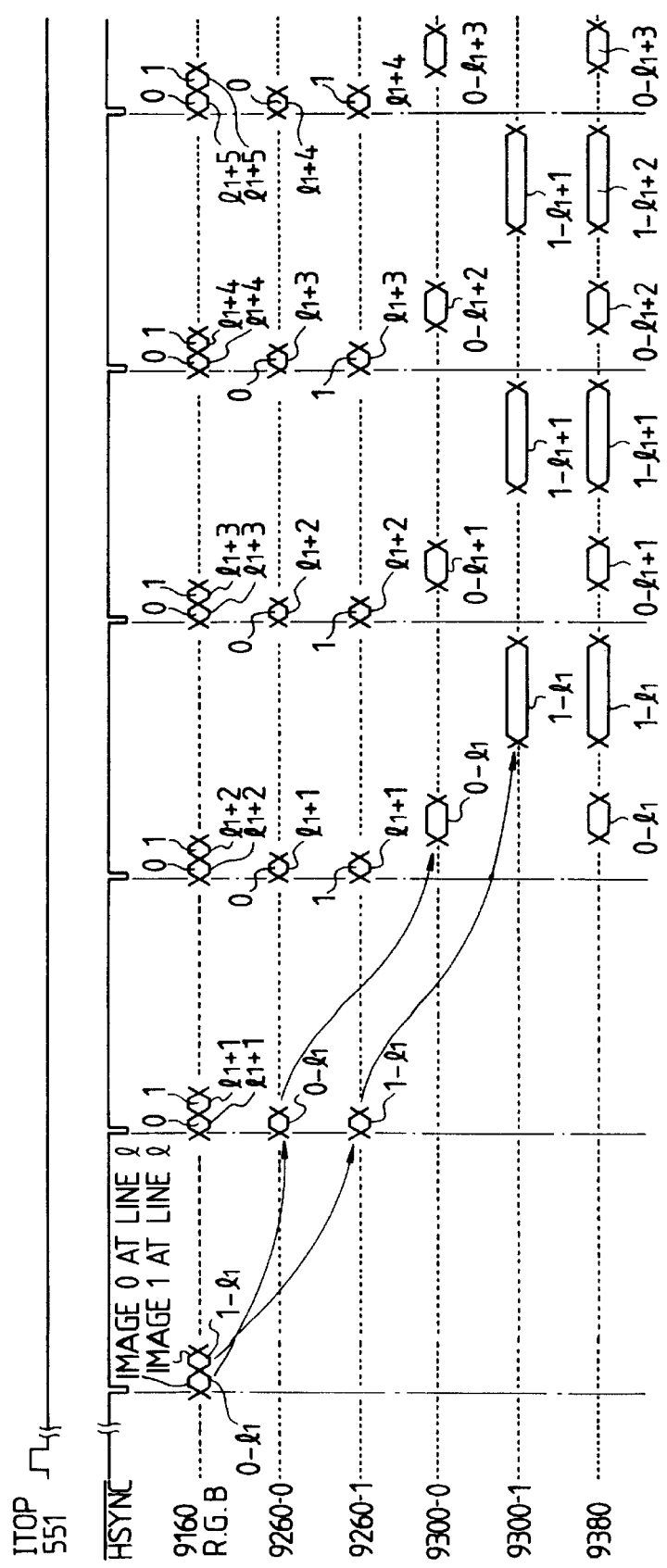
FIG. 21 is a timing chart upon image formation at line "$l_1$" shown in FIG. 20.
Figure 22:
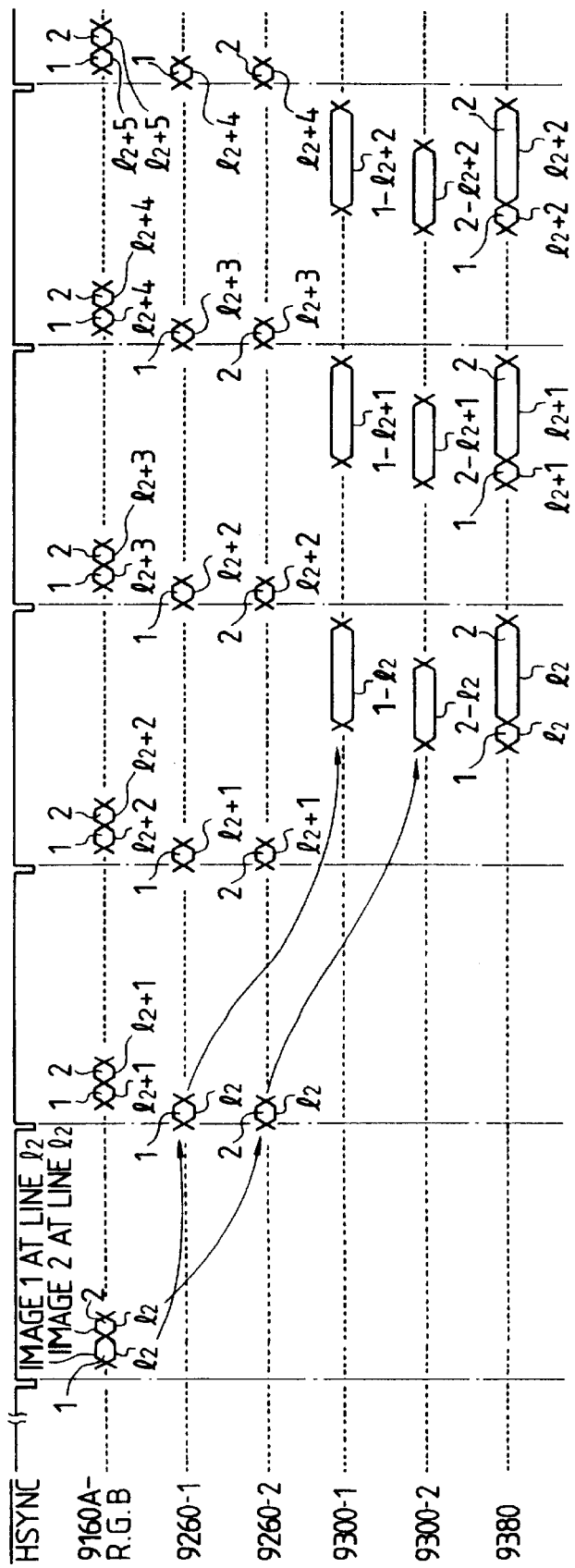
FIG. 22 is a timing chart upon image formation at line "$l_2$" in FIG. 20.

FIG. 21 is a timing chart in the case of forming the image at line "$l_1$" shown in FIG. 20. FIG. 22 is a timing chart in the case of forming the image at line "$l_2$" in FIG. 20.

The ITOP signal 551 is output from the color printer 2 in a manner similar to the above and the system controller 4210 starts the operation synchronously with the signal.

In the layout of the images shown in FIG. 20, "image 3" is obtained by rotating the image from the color reader 1 by 90°.

The image rotating process is executed in the following procedure. First, the images are transferred from the memories 4060R, 4060G, and 4060B to a work memory 4390 by a DMAC (direct memory access controller) 4380 in FIGS. 10A and 10B. Next, after the well-known image rotating process was executed in the work memory 4390 by the CPU 4360, the images are transferred from the work memory 4390 to the memories 4060R, 4060G, and 4060B by the DMAC 4380, so that the image rotating process is executed.

The position data of the images which were laid out and indicated and input by the digitizer 16 are sent to the image memory apparatus 3 through the video processing unit 12 in FIG. 1. When the system controller 4210 receives the developing position data for the images, the system controller generates operation permission signals 9320-0 to 9320-3 of the enlargement/interpolation circuits 4150-0 to 4150-3 corresponding to the images.

In the layout of arbitrary positions in the embodiment, for instance, the counter 0 (4080-0) operates in correspondence to "image 0", a counter 1 (4080-1) operates in correspondence to "image 1", a counter 2 (4080-2) operates in correspondence to "image 2", and a counter 3 (4080-3) operates in correspondence to "image 3", respectively.

Control upon image formation at line "$l_1$" shown in FIG. 20 will now be described with reference to FIG. 21.

When "image 0" is read out of the image memories 4060R, 4060G, and 4060B, the image data from addresses "0" to "0.5M" (storage area of "image 0"0 shown in FIG. 19) are read out by the counter 0 (4080-0). The outputs of the counters 4080-0 to 4080-3 are switched by the selector 4070.

Similarly, in the case of reading out "image 1", the image data from addresses "0.5M" to "1M" (storage area of "image 1" shown in FIG. 19) are read out by the counter 1 (4080-1). The reading timings are shown by 9160R, 9160G, and 9160B in FIG. 21.

The counters 4080-2 and 4080-3 are not operative by counter enable signals 9130-2 and 9130-3 from the system controller 4210.

The image data of "image 0" and "image 1" are sent to the masking/black extraction/UCR circuit 4120 through the LUT 4110R, 4110G, and 4110B and are converted into the area sequential color signal 9210. The area sequential color signal 9210 is converted into the parallel signals by the selector 4130 and separated every pixel and sent to the FIFO memories 4140-0 and 4140-1. When the operation permission signals 9320-0 and 9320-1 from the system controller 4210 to the enlargement/interpolation circuits 4150-0 and 4150-1 are set to the enable state, the circuits 4150-0 and 4150-1 set FIFO readout signals 9280-0 and 9280-1 to the enable state, thereby starting the reading control.

In response to the signals 9280-0 and 9280-1, the FIFO memories 4140-0 and 4140-1 start the transfer of the image data to the enlargement/interpolation circuits 4150-0 and 4150-1. The layout and interpolating calculations of the images are executed by the enlargement/interpolation circuits 4150-0 and 4150-1 in accordance with the area designated by the digitizer 16. The timings for those operations are shown by 9300-0 and 9300-1 in FIG. 21.

After the image data of "image 0" and "image 1" in which the layout and interpolating calculations had been executed were selected by the selector 4190, they pass through an edge filter circuit 4180 and are input to the LUT 4200. Since the processes until the subsequent connector 4550 are similar to those mentioned above, their descriptions are omitted.

The timings for line "$l_2$" shown in FIG. 20 will now be described with reference to FIG. 22.

The processes from the image memories 4060R, 4060G, and 4060B until the enlargement/interpolation circuits 4150-1 and 4150-2 are substantially the same as those mentioned above.

However, since both of the image data of "image 1" and "image 2" have been output at line "$l_2$", the counter 1 (4080-1), counter 2 (4080-2), FIFO memories 4140-1 and 4140-2, and enlargement/interpolation circuits 4150-1 and 4150-2 operate and they are controlled in accordance with the control signals from the system controller 4210.

As shown in FIG. 20, "image 1" and "image 2" are overlapped at line "$l_2$". In the overlap portion, a mode to form either one of the images or a mode to form both images can be selected by a control signal 9340 from the system controller 4210.

The practical control method is similar to that in the case mentioned above.

Signals from the connector 4550 are connected to the color reader 1 by the cable. Therefore, the video interface 101 of the color reader 1 selects and outputs the image signal 105 from the image memory apparatus 3 to the printer interface 56 via the signal line path shown in FIG. 5.

Figure 23:
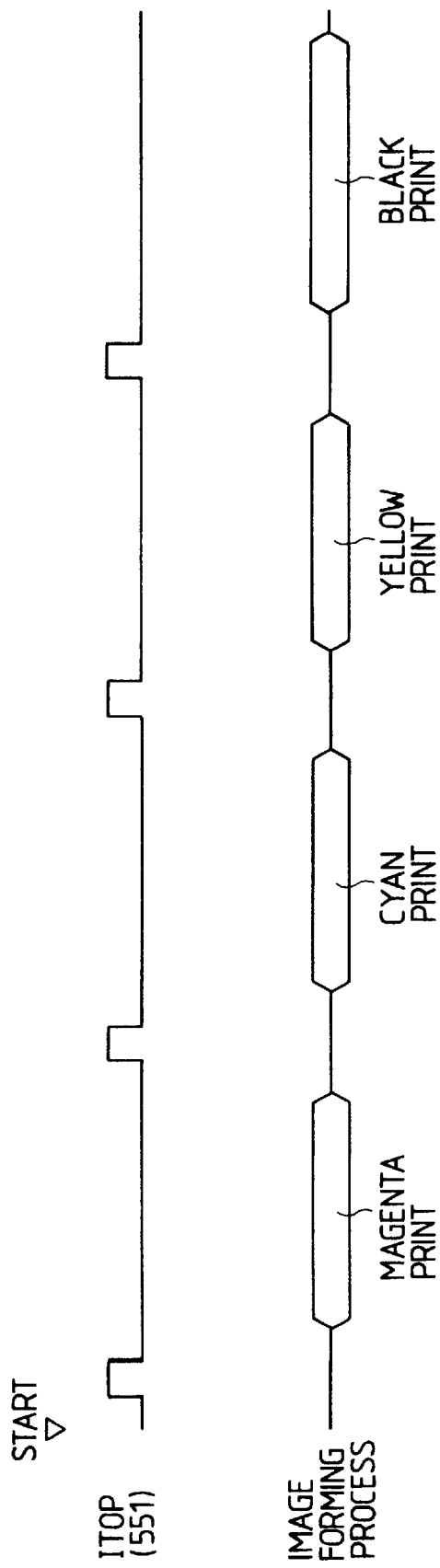
FIG. 23 is a timing chart for the image forming process of the embodiment.

The process to transfer the image data from the image memory apparatus 3 to the color printer 2 in the image formation in the above embodiment will now be described in detail hereinbelow with reference to a timing chart of FIG. 23.

As mentioned above, by pressing the start button of the operation unit 20, the printer 2 starts operating and starts the conveyance of the recording paper. When the recording paper reaches the front edge of the image forming unit, the ITOP signal 551 is output. The ITOP signal 551 is sent to the image memory apparatus 3 through the color reader 1. Under the set conditions, the image memory apparatus 3 reads out the image data stored in the image memories 4060R, 4060G, and 4060B and these image data are subjected to the processes for the layout, enlargement/interpolation, and the like mentioned above and, thereafter, the processed image data is sent to the video processing unit 12 of the color reader 1. The video interface 101 of the video processing unit 12 changes the processing method in the video interface 101 in accordance with the kind (R, G, B)/(M, C, Y, Bk) of the data transmitted.

In the embodiment, since the area sequential image data of M, C, Y, and Bk is output, the above operations are repeated four times in accordance with the order of M, C, Y, and Bk, thereby forming an image.

<Printer unit>

A construction of the color printer 2 to print out the image signal processed by the video processing unit 12 as mentioned above will be described with reference to FIG. 1.

In the construction of the printer 2 in FIG. 1, reference numeral 711 denotes a scanner having: a laser output unit to convert the image signal from the color reader 1 into the photo signal; a polygon mirror 712 of a polyhedron (for instance, octahedron); a motor (not shown) to rotate the polygon mirror 712; an f/θ lens (image forming lens) 713; and the like. Reference numeral 714 denotes a reflecting mirror to change the optical path of the laser beam from the scanner 711 shown by an alternate long and short dash line in the diagram, and 715 indicates a photo sensitive drum.

The laser beam emitted from the laser output unit is reflected by the polygon mirror 712 and scans (raster scan) like a line on the surface of the photo sensitive drum 715 by the f/θ lens 713 and reflecting mirror 714, thereby forming an electrostatic latent image corresponding to the original image.

Reference numeral 717 denotes a primary charging device; 718 indicates a whole surface exposure lamp; 723 a cleaner unit to collect the residual toner which was not copy transferred; and 724 a copy transfer precharging device. Those parts are arranged around the photo sensitive drum 715. Reference numeral 726 denotes a developing unit to develop the electrostatic latent image formed on the surface of the photo sensitive drum 715 by the laser exposure; 731Y (for yellow), 731M (for magenta), 731C (for cyan), and 731Bk (for black) indicate developing sleeves which are come into contact with the photo sensitive drum 715 and directly execute the development; 730Y, 730M, 730C, and 730Bk toner hoppers to hold spare toners; and 732 a screw to transfer a developing agent. The developing unit 726 is constructed by the sleeves 731Y to 731Bk, toner hoppers 730Y to 730Bk, and screw 732. Those parts are arranged around a rotary shaft P of the developing unit 726.

For instance, when a yellow toner image is formed, the yellow toner development is executed at the position shown in the diagram. In the case of forming a magenta toner image, the developing unit 726 is rotated around the shaft P as a rotational center in the diagram, thereby setting the developing sleeve 731M in the magenta developing unit to the position where the sleeve 731M is come into contact with the photo sensitive drum 715. In the case of developing cyan and black images, the developing unit 726 is also rotated around the shaft P in the diagram as a rotational center and is made operative in a manner similar to the above.

On the other hand, reference numeral 716 indicates a copy transfer drum to copy transfer the toner image formed on the photo sensitive drum 715 onto the recording paper. Reference numeral 719 indicates an actuator plate to detect the moving position of the copy transfer drum 716; 720 a position sensor to detect that the copy transfer drum 716 has moved to the home position by approaching to the actuator plate 719; 725 a copy. transfer drum cleaner; 727 a paper pressing roller; 728 a discharging device; and 729 a copy transfer charging device. The above parts 719, 720, 725, 727, and 729 are arranged around the copy transfer drum 716.

On the other hand, reference numerals 735 and 736 denote the paper feed cassettes to collect the papers (cut sheets); 737 and 738 indicate paper feed rollers to feed the papers from the cassettes 735 and 736; and 739, 740, and 741 represent timing rollers to match the timings for the paper feed and conveyance. The paper which was fed and conveyed by those rollers is guided and led by a paper guide 749 and the front edge of the paper is gripped by a gripper, which will be explained hereinlater, and is wrapped around the copy transfer drum 716. The process advances to the image forming step.

Reference numeral 550 denotes a drum rotating motor to synchronously rotate the photo sensitive drum 715 and the copy transfer drum 716; 750 indicates a peeling-off claw to peel off the paper from the copy transfer drum 716 after completion of the image formation; 742 a conveying belt to convey the removed paper; and 743 an image fixing unit to fix the paper conveyed by the belt 742. In the image fixing unit 743, the rotating force of a motor 747 attached to a motor attaching section 748 is transferred through a transfer gear 746 to a pair of thermal pressure rollers 744 and 745 and the image on the paper which is conveyed between the rollers 744 and 745 is fixed.

The printing-out process of the printer 2 having the above construction will now be described hereinbelow with reference to the timing chart of FIG. 23 as well.

First, when the first ITOP signal 551 is input, a Y latent image is formed onto the photo sensitive drum 715 by the laser beam and is developed by the developing sleeve 731Y. The developed Y image is then copy transferred onto the paper on the copy transfer drum and the magenta printing process is executed. The developing unit 726 is then rotated around the shaft P in the diagram as a rotational center.

When the next ITOP signal 551 is input, an M latent image is formed onto the photo sensitive drum by the laser beam and the cyan printing process is executed hereinafter by the similar operation. By also executing the above operation for the C and Bk latent images in response to the subsequent ITOP signals 551, the yellow and black printing processes are executed. After completion of the image formation, the recording paper is peeled off from the drum by the peeling-off claw 750 and the image is fixed by the image fixing unit 743. In this manner, a series of color image printing processes are executed.

Figure 24B:
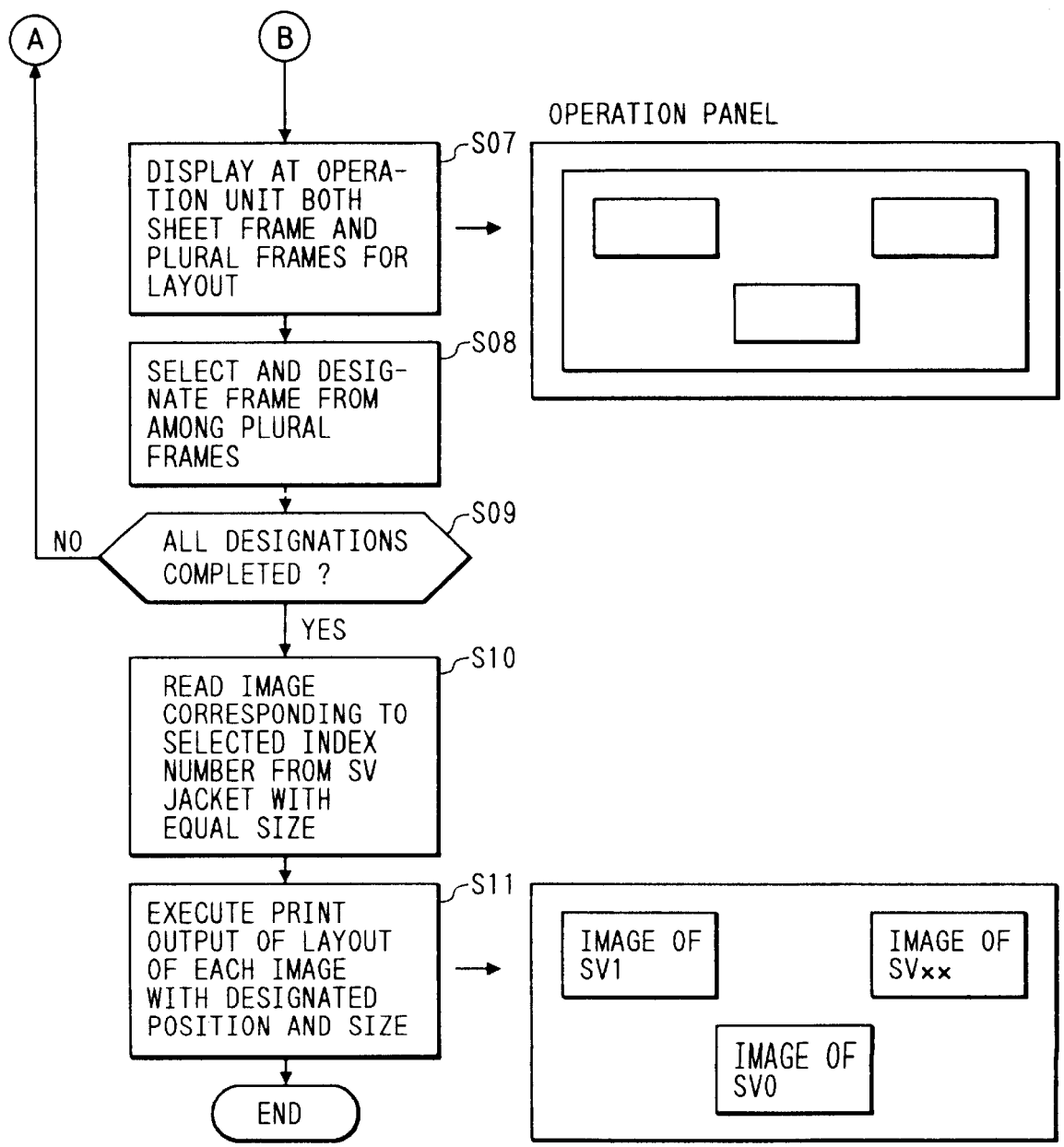
FIG. 24, comprised of FIGS. 24A and 24B is a flowchart showing an example of an operation procedure of the embodiment.

In the embodiment, the video apparatus 1 is the SV recorder of the NTSC standard. A plurality of, for instance, fifty images are stored in a single SV jacket. In the case of outputting a single print, arbitrary number of images are selected from the stored SV images and an output layout of those images can be executed. FIG. 24 shows a procedure in the embodiment and images which are obtained by the embodiment.

First, all of the images registered in the SV jacket are reduced and images of a single surface which were laid out in accordance with the order (hereinafter, referred to as index Nos.) registered in the SV jacket are formed in accordance with the size which has previously been stored in an ROM 4370 shown in FIG. 10B (steps S01 to S03).

That is, the CPU 4360 of the image memory apparatus 3 read out the input SV video images in accordance with the order registered in the SV jacket (S01), reduces (S02), and stores into the FIFO memories 4050R, 4050G, and 4050B. In such a case, the image data is reduced in the main scanning direction by setting the data in the RAM 4212 in the image effective area into "1" in accordance with the reduction ratio.

Figure 15:
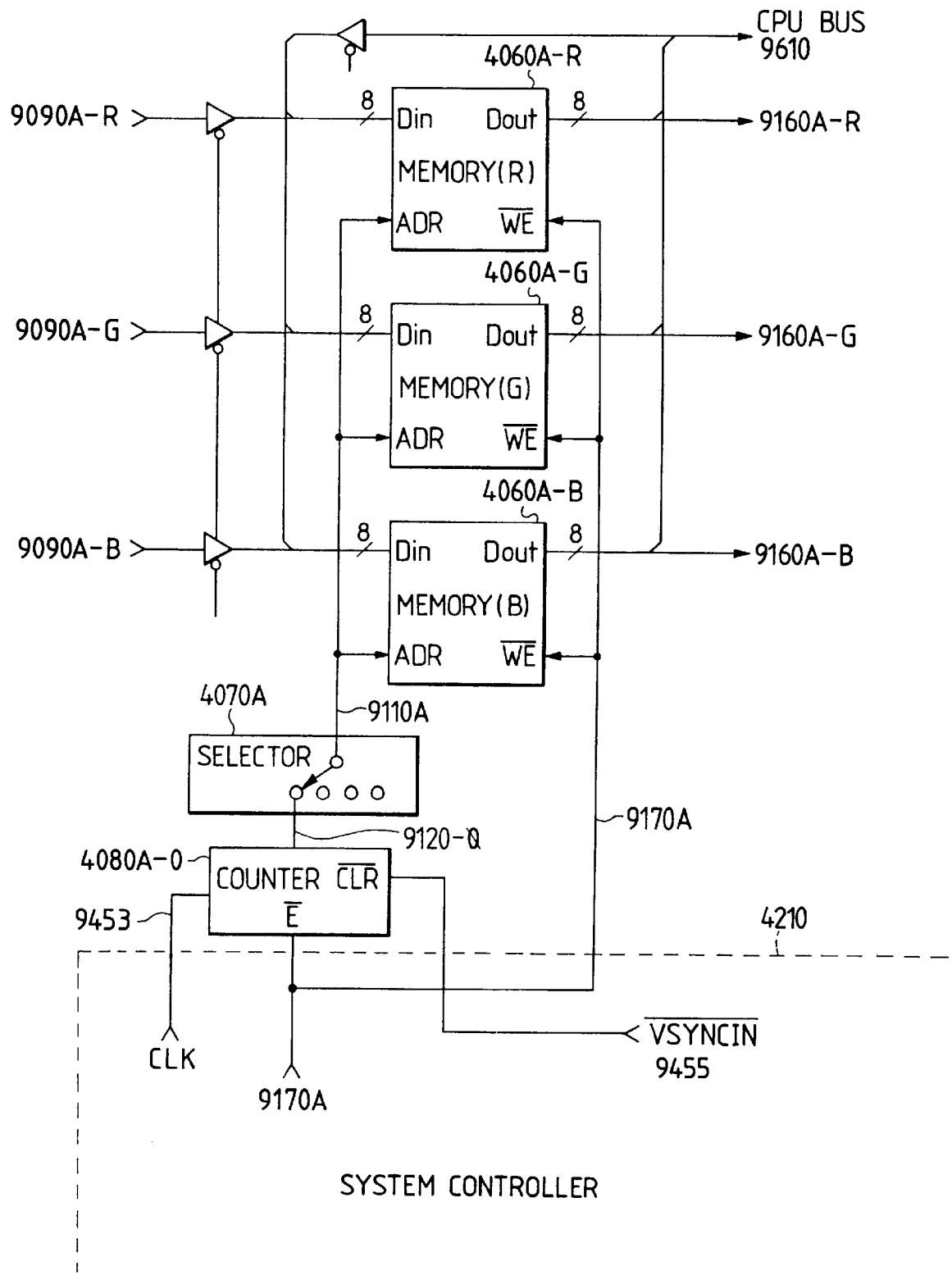
FIG. 15 is a detailed diagram of a construction of the system controller unit and image memories of the image memory apparatus of the embodiment.

The data transfer from the FIFO memories 4050R, 4050G, and 4050B shown in FIG. 12 to the memories 4060R, 4060G, and 4060B shown in FIG. 15 is executed in a manner similar to the case of the data writing control from the color reader 1 to the memories 4060R, 4060G, and 4060B in the above embodiment.

The image data in the subscanning direction is reduced by setting the data into the RAM 4212 in FIG. 15 in a manner similar to the above.

When the video image data in the memories 4060R, 4060G, and 4060B of the reduced one SV image are transferred to display memories 4410R, 4410G, and 4410B shown in FIG. 10A, they are laid out from the upper left position in accordance with the order, and the input and reduction of the SV images and the arrangement into the display memories are repetitively executed for all of the SV images (S03). The video image data in which all of the images in the SV jacket were laid out on a single surface and which were stored in the display memories 4410R, 4410G, and 4410B pass through LUT 4420R, 4420G, and 4420B and are sent to D/A converters 4430R, 4430G, and 4430B. The video image data are converted into an analog R signal 4590R, an analog G signal 4590G, and an analog B signal 4590B synchronously with an SYNC signal 4590S from a display controller 4440 by the D/A converters 4430R, 4430G, and 4430B. These analog signals are output to the monitor. On the other hand, the display controller 4440 outputs an SYNC signal 9600 synchronously with output timings of those analog signals. By connecting the analog R, G, and B signals 4590R, 4590G, and 4590B and the SYNC signal 4590S to the monitor 32, the storage contents of the image memory apparatus 3 can be displayed (S04).

The images (hereinafter, referred to as index image surface) in which all of the image data in the SV jacket were reduced and laid out in one image surface are displayed on the monitor 32.

Next, the control unit 13 displays the index Nos. in the SV jacket corresponding to the SV index image surface onto the liquid crystal touch panel of the operation unit 20 (S05). To input the No. of a desired SV image from the index image surface on which a plurality of SV images are displayed, the operator presses the index No. portion displayed on the touch panel. Thus, the control unit 13 discriminates the index No. of the designated SV and stores the index No. into the storage area in the control unit 13 (S06).

When the completion of the selection of the index No. is informed by pressing the end key, the display of the touch panel of the operation unit 20 is switched to the display of the frame of the paper image which has previously been stored in the control unit 13 and the display of a plurality of frames of a fixed layout in the paper image frame (S07). In this state, the operator selects a desired layout position in the paper where the image of the selected SV index No. is arranged from a plurality of frames displayed and designates it by pressing the touch panel at that position. The control unit 13 stores the information in which the selected SV index No. and the position information in the paper of the image output are made correspond into the storage area in the control unit 13, that is, into an RAM 1013 shown in FIG. 1 (S08).

The above operations are repeated until the designation of a desired layout is finished (S09). In the embodiment, it is determined that such a designation is finished due to the depression of the print key. Finally, when the print key of the operation unit 20 is pressed, the processing routine advances from step S09 to step S10. The image data of the equal size are read out from the SV jacket in accordance with the order of the index Nos. stored in the storage area in the control unit 13 without executing the reduction (S10).

In the case of digitizing the video image of the SV recorder, the capacity of the image surface is set to 640 pixies (H)×480 pixels (V).

Therefore, the CPU 4360 of the image memory apparatus 3 first writes the "0" data into the RAM 4212 by the amount of 640 pixels in the main scanning direction. Next, the input of the selector 4213 is switched to the counter 4214 side. In a manner similar to the case of the foregoing embodiment, the data from the RAM 4212 is set to the data for the $\overline{WE}$ signal control of the FIFO memories 4050R, 4050G, and 4050B. At this time, by writing "0" into the RAM 4212, the data of one main scanning operation of the video images in the memories 9060R, 9060G, and 9060B as output signals from the A/D converters 4020R, 4020G, and 4020B are stored into the FIFO memories 4050R, 4050G, and 4050B at the equal size.

The image data are transferred from the FIFO memories 4050R, 4050G, and 4050B to the memories 4060R, 4060G, and 4060B, the above operation is executed for all of the SV images selected in step S08, and a plurality of SV images are stored into the image memories 4060R, 4060G, and 4060B.

After that, the images are laid out on the basis of the position and size data stored in the control unit 13 and are output and printed by the color printer 2 (S11).

Since the reading control of the stored data from the image memories 4060R, 4060G, and 4060B to the color printer 2 and the recording control of the color printer 2 at this time are similar to those in the foregoing embodiment, their descriptions are omitted.

The operations in steps S10 and S11 will now be further described in detail with reference to FIGS. 25 and 26.

In the embodiment, the SV record regenerating apparatus 31 executes the operation in accordance with commands which are input from the CPU 4360 in the image memory apparatus 3 through a GPIB controller 4310.

The CPU 4360 in the image memory apparatus 3 executes the communication with the control unit in the color reader 1 and the operation is controlled.

Figure 25:
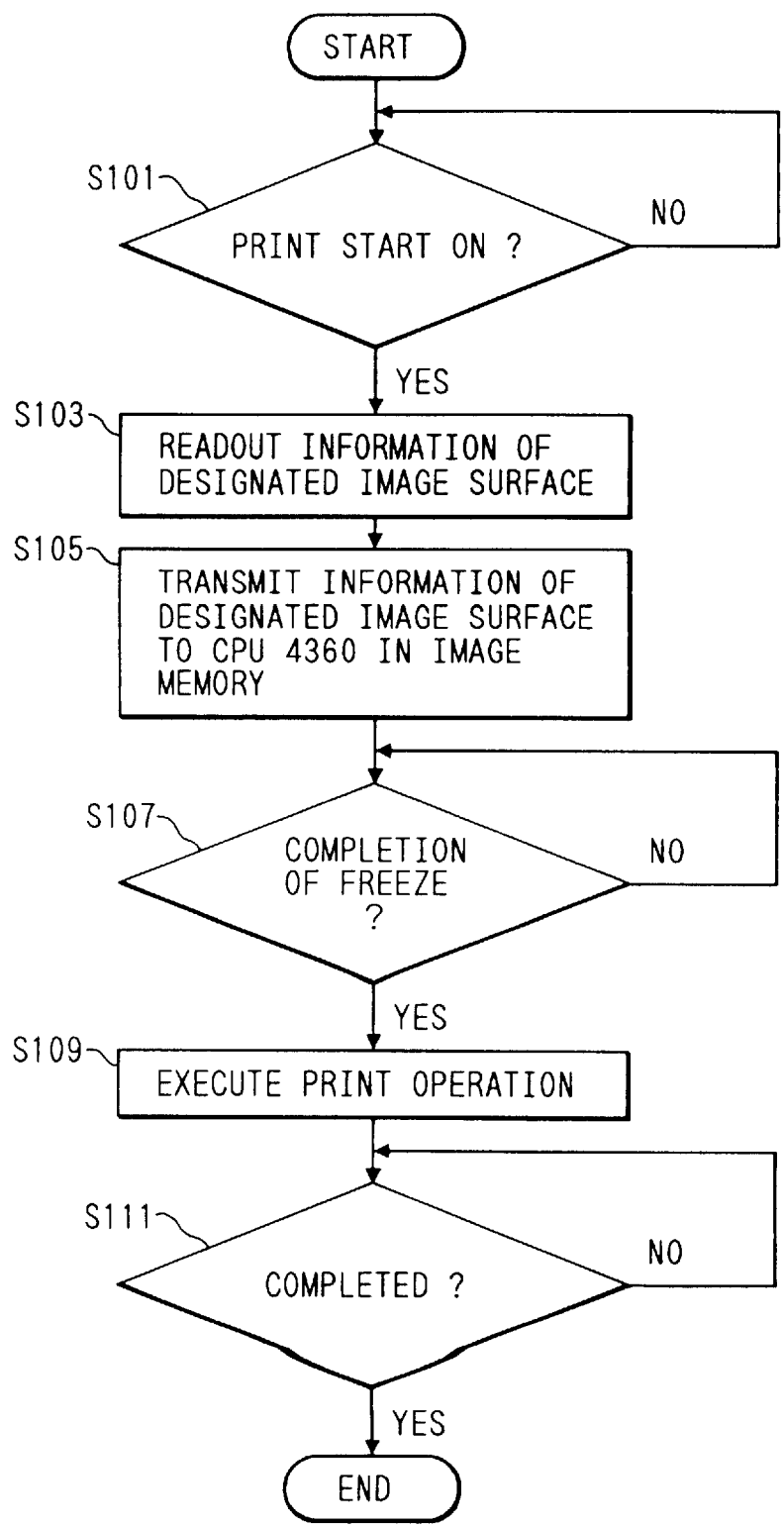
FIGS. 25 and 26 are flowcharts for explaining the operations of a color reader 1 and an image memory apparatus 3, respectively.
Figure 26:
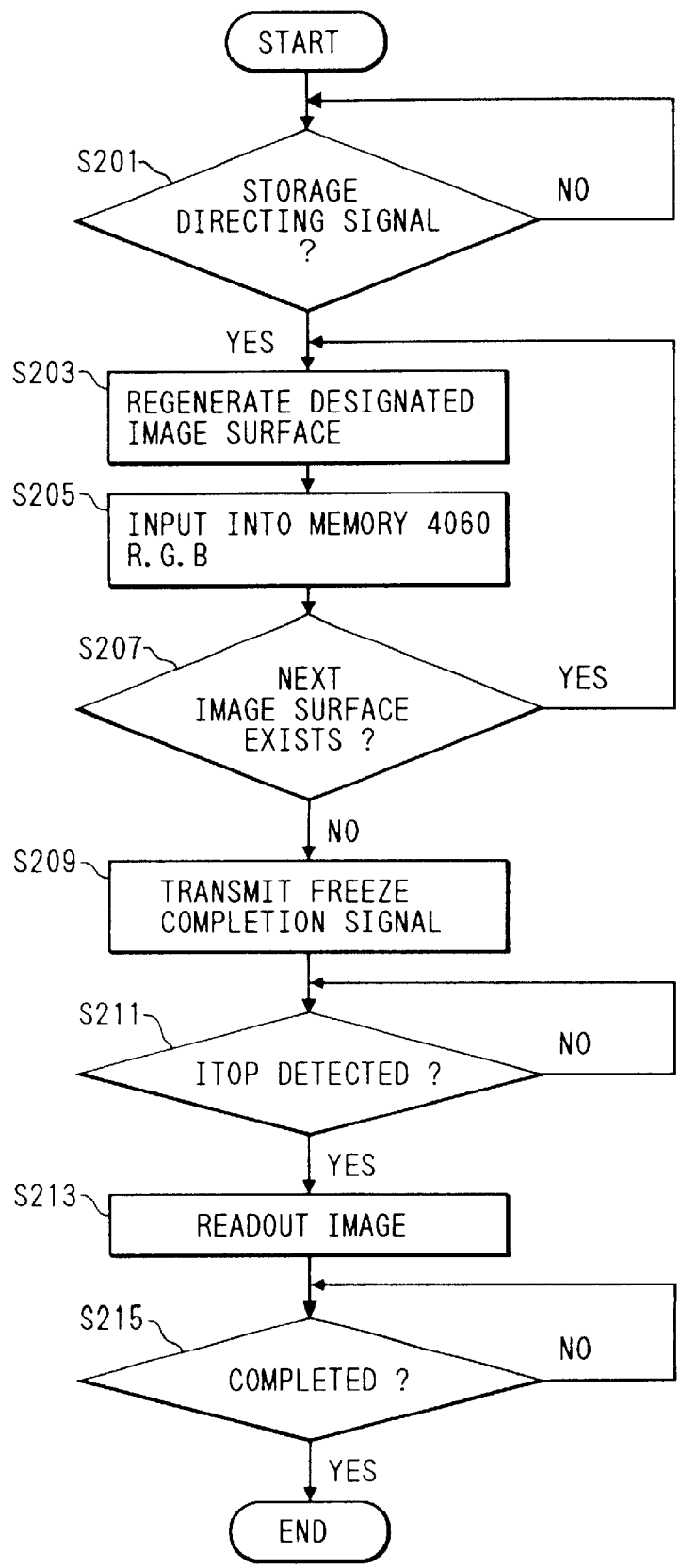

FIG. 25 is a flowchart for the operation of the control unit in the color reader 1. FIG. 26 is a flowchart for the operation of the CPU 4360 in the image memory apparatus 3.

In FIG. 25, when the print start switch is pressed (S101), the index Nos., that is, the information of the designated image surface and the layout data which were selected and designated in steps S05 to S09 are read out of the RAM 1013 in the color reader 1 (S103). The designated image surface data and the layout data are transmitted to the CPU 4360 in the image memory apparatus 3 via the CPU bus (S105). Upon reception of the transmitted data, the image memory apparatus 3 again executes the regenerating operation and the storing operation of the image signals from the SV record regenerating apparatus as will be explained hereinlater.

If a freeze completion signal is obtained from the SV record regenerating apparatus 31 (S107), the processing routine advances to step S109. An instruction to allow the printer 2 to execute the printing operation is given (S109). The system waits for completion of the printing operation (S111) and the processing routine is finished.

The operation of the image memory apparatus 3 will now be described with reference to a flowchart of FIG. 26.

The CPU 4360 in the image memory apparatus 3 receives the designated image surface data and the layout data from the control unit (S201). The CPU 4360 then gives an instruction for regeneration to the SV record regenerating apparatus 31 so as to regenerate the designated image surface (S203). When a desired image surface has been regenerated by the SV record regenerating apparatus 31, the image data of the equal size are written into the memories 4060R, 4060G, and 4060B in a manner as mentioned above (S205). A check is made to see if the image data to be stored next exists or not on the basis of the designated image surface data and the layout data mentioned above (S207). If the data to be stored next does not exist, the freeze completion signal is transmitted to the color reader 1 (S209). If the freeze completion signal has been transmitted, a check is made to see if the ITOP signal has been input from the printer 2 or not (S211). The image data stored in the memories 4060R, 4060G, and 4060B are read out synchronously with the detected ITOP signal (S213).

Although the embodiment has been described above with respect to the example of the still video apparatus, the invention is not limited to such an apparatus. The invention can be also applied to other image sources such as VTR, image files, and the like.

As described above, according to the embodiment, only the necessary image data can be efficiently selected from the memory apparatus to store the image data and images can be formed on the image forming medium.

What is claimed is:

1. An image forming method comprising:

a first reading step of reading out a plurality of image data from an image memory device, each image data representing a single picture, and supplying the image data so that the plurality of image data are simultaneously displayed on a monitor;

a receiving step of receiving an instruction for selection of a desired image from the plurality of images displayed on said monitor;

a second reading step of reading out again the image data in accordance with the selection instruction such that the selected image data is not stored to said display memory but instead is stored to a second memory for image processing;

a forming step of forming on an image forming medium an image corresponding to the image data stored to said second memory in said second reading step; and a processing step of processing the image data read out again in said second reading step, in accordance with a designated size or position.

2. A method according to claim 1, wherein said memory device includes a still video reproducing apparatus.

3. A method according to claim 1, wherein the plurality of image data each representing a single picture each comprises a color image.

4. A method according to claim 1, wherein said forming step is performed in an electrophotographic system.

5. A method according to claim 6, wherein said receiving step further receives an instruction regarding a size or portion of an image to be formed on the image forming medium.

6. A method according to claim 1, further comprising a displaying step of displaying a layout of the image selected according to the instruction.

7. A method according to claim 6, wherein the layout of the image selected according to the instruction is displayed on the monitor.

8. An image forming system, comprising:

an image data storage medium;

reading means for reading out a plurality of sets of image data from the image data storage medium, each set of image data representing a single picture;

reducing means for reducing the plurality of pictures represented by the plurality of sets of image data read out by said reading means;

displaying means for simultaneously displaying a plurality of pictures reduced by said reducing means;

designating means for designating a desired picture among the plurality of reduced pictures displayed by said displaying means; and image forming means for forming an image corresponding to the desired picture designated by said designating means;

wherein said designating means is adapted to designate a plurality of said desired pictures, and the position and size of each of said desired pictures in the formed image;

wherein said reading means is adapted to read out designated sets of image data representing the designated plurality of desired pictures; and wherein said image forming means is adapted to form the designated plurality of desired pictures at the designated positions and sizes on a medium based on the designated sets of image data read out by said reading means.

9. A system according to claim 8, wherein the image data storage medium is a still video reproducing apparatus.

10. A system according to claim 8, wherein said designating means has operation units equal in number to the number of said plurality of sets of image data.

11. A system according to claim 8, wherein said image forming means includes a printer to print said designated sets of image data as visible images on said medium.

12. A system according to claim 8, wherein said display means comprises a monitor.

13. A system according to claim 8, wherein the plurality of sets of image data each representing a single picture each comprises a color image.

14. An image processing method comprising:

a first reading step of reading out a plurality of image data from an image memory device, each image data representing a single picture, and supplying the image data so that the plurality of image data are simultaneously displayed on a monitor;

a receiving step of receiving an instruction for selection of a desired image from the plurality of images displayed on the monitor;

a second reading step of reading out again the image data in accordance with the selection instruction such that the selected image data is not stored to the display memory but instead is stored to a second memory for image processing;

a processing step of processing the image data read out again in said second reading step, in accordance with a designated size or position; and a supplying step of supplying image forming data in order to form on an image forming medium corresponding to the image stored to the second memory in said second reading step.

15. A method according to claim 14, wherein the image memory device includes a still video reproducing apparatus.

16. A method according to claim 14, wherein the plurality of image data each corresponding to a single picture each comprises a color image.

17. A method according to claim 14, wherein image formation on the image forming medium is performed in an electrophotographic system.

18. A method according to claim 14, further comprising a displaying step of displaying a layout of the image selected according to the instruction.

19. A method according to claim 18, wherein the layout of the image selected according to the instruction is displayed on the monitor.

20. A method according to claim 18, wherein said receiving step further receives an instruction regarding a size or portion of an image to be formed on the image forming medium.

21. An image forming system comprising:

an image data storage medium;

reading means for reading out a plurality of sets of image data from the image data storage medium, each set of image data representing a single picture;

reducing means for reducing the plurality of pictures represented by the plurality of sets of image data read out by said reading means;

displaying means for simultaneously displaying a plurality of pictures reduced by said reducing means;

designating means for designating a desired picture among the plurality of reduced pictures displayed by said displaying means; and image data supplying means for supplying image data to image forming means in order to form an image corresponding to the desired picture designated by said designating means, wherein said designating means is adapted to designate the plurality of desired pictures, and the position and size of each of the desired pictures in the formed image, said reading means is adapted to read out designated sets of image data representing the designated plurality of desired pictures, and said image forming means is adapted to form the designated plurality of desired pictures at the designated positions and sizes on a medium based on the designated sets of image data read out by said reading means.

22. A system according to claim 21, wherein the image data storage medium is a still video reproducing apparatus.

23. A system according to claim 21, wherein said designating means has operation units equal in number to the number of the plurality of sets of image data.

24. A system according to claim 21, wherein said image forming means includes a printer to print the designated sets of image data as visible images on the medium.

25. A system according to claim 21, wherein said display means comprises a monitor.

26. An image forming apparatus comprising:

first reading means for reading out a plurality of image data from an image memory device, each image data representing a single picture, and supplying the image data so that the plurality of image data are simultaneously displayed on a monitor;

receiving means for receiving an instruction for selection of a desired image from the plurality of images displayed on the monitor;

second reading means for reading out again the image data in accordance with the selection instruction such that the selected image data is not stored to the display memory but instead is stored to a second memory for image processing;

forming means for forming on an image forming medium an image corresponding to the image data stored to the second memory by said second reading means; and processing means for processing the image data read out again by said second reading means, in accordance with a designated size or position.

27. An apparatus according to claim 26, wherein the image memory device includes a still video reproducing apparatus.

28. An apparatus according to claim 26, wherein the plurality of image data each corresponding to a single picture each comprises a color image.

29. An apparatus according to claim 26, wherein said forming means includes an electrophotographic system.

30. An apparatus according to claim 26, further comprising displaying means for displaying a layout of the image selected according to the instruction.

31. An apparatus according to claim 30, wherein the layout of the image selected according to the instruction is displayed on the monitor.

32. An apparatus according to claim 30, wherein said receiving means further receives an instruction regarding a size or portion of an image to be formed on the image forming medium.

33. An image processing apparatus comprising:

first reading means for reading out a plurality of image data from an image memory device, each image data representing a single picture, and supplying the image data so that the plurality of image data are simultaneously displayed on a monitor;

receiving means for receiving an instruction for selection of a desired image from the plurality of images displayed on the monitor;

second reading means for reading out again the image data in accordance with the selection instruction such that the selected image data is not stored to the display memory but instead is stored to a second memory for image processing;

processing means for processing the image data read out again by said second reading means, in accordance with a designated size or position; and supplying means for supplying image forming data in order to form on an image forming medium an image corresponding to the image data stored to the second memory by said second reading means.

34. An apparatus according to claim 33, wherein the image memory device includes a still video reproducing apparatus.

35. An apparatus according to claim 33, wherein the plurality of image data each corresponding to a single picture each comprises a color image.

36. An apparatus according to claim 33, further comprising forming means including an electrophotographic system for forming the image on the image forming medium.

37. An apparatus according to claim 33, further comprising displaying means for displaying a layout of the image selected according to the instruction.

38. An apparatus according to claim 37, wherein the layout of the image selected according to the instruction is displayed on the monitor.

39. An apparatus according to claim 37, wherein said receiving step further receives an instruction regarding a size or portion of an image to be formed on the image forming medium.

40. An image forming method comprising:

a reading step of reading out a plurality of sets of image data from an image data storage medium, each set of image data representing a single picture;

a reducing step of reducing the plurality of pictures represented by the plurality of sets of image data read out in said reading step;

a displaying step of simultaneously displaying a plurality of pictures reduced in said reducing step;

a designating step of designating a desired picture among the plurality of reduced pictures displayed in said displaying step; and an image forming step of forming an image corresponding to the desired picture designated in said designating step, wherein said designating step is adapted to designate a plurality of the desired pictures, and the position and size of each of the desired pictures in the formed image, said reading step is adapted to read out designated sets of image data representing the designated plurality of desired pictures, and said image forming step is adapted to form the designated plurality of desired pictures at the designated positions and sizes on a medium from the designated sets of image data read out in said reading step.

41. A method according to claim 40, wherein the image data storage medium is a still video reproducing apparatus.

42. A method according to claim 40, wherein in said designating step there are used operation units equal in number to the number of the plurality of sets of image data.

43. A method according to claim 40, wherein in said image forming step a printer is used to print the designated sets of image data as visible images on the medium.

44. A method according to claim 40, wherein said displaying step displays on a monitor.

45. An image forming method comprising:

a reading step of reading out a plurality of sets of image data from the image data storage medium, each set of image data representing a single picture;

a reducing step of reducing the plurality of pictures represented by the plurality of sets of image data read out in said reading step;

a displaying step of simultaneously displaying a plurality of pictures reduced in said reducing step;

a designating step of designating a desired picture among the plurality of reduced pictures displayed in said displaying step; and an image data supplying step of supplying image data to image forming means in order to form an image corresponding to the desired picture designated in said designating step, wherein said designating step is adapted to designate the plurality of desired pictures, and the position and size of each of the desired pictures in the formed image, said reading step is adapted to read out designated sets of image data representing the designated plurality of desired pictures, and said image forming step is adapted to form the designated plurality of desired pictures at the designated positions and sizes on a medium based on the designated sets of image data read out in said reading step.

46. A method according to claim 45, wherein the image data storage medium is a still video reproducing apparatus.

47. A method according to claim 45, wherein in said designating step there are used operation units equal in number to the number of the plurality of sets of image data.

48. A method according to claim 45, wherein said image forming means includes a printer to print the designated sets of image data as visible imaged on the medium.

49. A method according to claim 45, wherein said displaying step displays on a monitor.

* * * * *

UNITED STATES PATENT AND TRADEMARK OFFICE
CERTIFICATE OF CORRECTION

PATENT NO. : 5,774,235
DATED : June 30, 1998
INVENTOR(S) : NAOTO ARAKAWA ET AL.

It is certified that error appears in the above-indentified patent and that said Letters Patent is hereby corrected as shown below:

On the title page, item

[56] REFERENCES CITED

Foreign Patent Documents
    Insert: --60-207969  10/1985  Japan--.

Insert: --OTHER PUBLICATIONS
          Interleaf Workstation Publishing Software Reference Manual", Vol. 1, Editing for Sun Users, Release 2.0, June 1985.--.

COLUMN 2

Line 55, "line "$1_1$"" should read --line "$\ell_1$"--.
Line 56, ""shown" should read --shown--.

COLUMN 3

Line 20, "herein-later" should read --hereinlater--.

COLUMN 6

Line 67, "9423G,," should read --9423G,--.

COLUMN 7

Line 64, "t pixels" should read --$\ell$ pixels--.

UNITED STATES PATENT AND TRADEMARK OFFICE
CERTIFICATE OF CORRECTION

PATENT NO. : 5,774,235
DATED : June 30, 1998
INVENTOR(S) : NAOTO ARAKAWA ET AL.

Page 2 of 3

It is certified that error appears in the above-indentified patent and that said Letters Patent is hereby corrected as shown below:

COLUMN 9

Line 64, "correspindence" should read --correspondence--.

COLUMN 10

Line 24, "GI" should read --G,--.

COLUMN 14

Line 43, ""image 0"0" should read --"image 0"--.

COLUMN 16

Line 8, "photo sensitive" should read --photosensitive--.
Line 18, "photo sensitive" should read --photosensitive--.
Line 21, "photo sensitive" should read --photosensitive--.
Line 23, "are" should read --have--.
Line 24, "photo sensitive" should read --photosensitive--.
Line 37, "is come" should read --comes--.
Line 67, "photo sensitive" should read --photosensitive--.

COLUMN 17

Line 15, "photo sensitive" should read --photosensitive--.

UNITED STATES PATENT AND TRADEMARK OFFICE
CERTIFICATE OF CORRECTION

PATENT NO. : 5,774,235
DATED : June 30, 1998
INVENTOR(S) : NAOTO ARAKAWA ET AL.

It is certified that error appears in the above-indentified patent and that said Letters Patent is hereby corrected as shown below:

COLUMN 24

```
Line 57, "imaged" should read --images--.
```

Signed and Sealed this

Twenty-eighth Day of September, 1999

*Attest:*

Q. TODD DICKINSON

*Attesting Officer*  *Acting Commissioner of Patents and Trademarks*